US012709105B2

(12) United States Patent
Tokai

(10) Patent No.: US 12,709,105 B2
(45) Date of Patent: Aug. 18, 2026

(54) PRINTING APPARATUS AND PRINTING METHOD

(71) Applicant: SEIKO EPSON CORPORATION, Tokyo (JP)

(72) Inventor: Yoshitsugu Tokai, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 255 days.

(21) Appl. No.: 18/338,840

(22) Filed: Jun. 21, 2023

(65) Prior Publication Data

US 2023/0415496 A1 Dec. 28, 2023

(30) Foreign Application Priority Data

Jun. 23, 2022 (JP) ................................ 2022-100957

(51) Int. Cl.
*B41J 11/00* (2006.01)
*B41M 7/00* (2006.01)

(52) U.S. Cl.
CPC .... *B41J 11/00214* (2021.01); *B41J 11/00212* (2021.01); *B41M 7/0081* (2013.01)

(58) Field of Classification Search
CPC ........... B41J 11/00212; B41J 11/00214; B41J 11/00218; B41J 2/01; B41M 7/0081; B41M 7/009
See application file for complete search history.

(56) References Cited

U.S. PATENT DOCUMENTS 8,702,225 B2 * 4/2014 Kachi ................ B41J 11/00218 347/102
2011/0074857 A1 * 3/2011 Mitsuzawa ........ B41J 11/00212 347/16
2012/0281039 A1 11/2012 Mitsuzawa
(Continued)

FOREIGN PATENT DOCUMENTS

JP 2009-202418 A 9/2009
JP 2012232515 11/2012
(Continued)

OTHER PUBLICATIONS

KR 102054110 B1 machine translation (Year: 2025).*
JP 2019181926 A machine translation—JPlatPat (Year: 2025).*
WO-2021048953-A1 machine translation (Year: 2025).*

*Primary Examiner* — Stephen D Meier
*Assistant Examiner* — Thomas Ray Knief
(74) *Attorney, Agent, or Firm* — WORKMAN NYDEGGER

(57) ABSTRACT

A printing apparatus includes a carriage and a control unit. The carriage includes a head configured to move in a first direction, and a light emission unit configured to relatively move in a second direction. The light emission unit includes a first emission group and a second emission group arranged in the second direction. The first emission group is disposed at a position that overlaps with the plurality of nozzles in the first direction. The second emission group is disposed at a position that does not overlap with the plurality of nozzles (Continued)

in the first direction. The control unit is configured to perform a first mode in which ultraviolet light is emitted from the first emission group and the second emission group, and a second mode in which ultraviolet light is not emitted from the first emission group and ultraviolet light is emitted from the second emission group.

11 Claims, 12 Drawing Sheets

(56) References Cited

U.S. PATENT DOCUMENTS

| | | | | |
|---|---|---|---|---|
| 2014/0292877 | A1* | 10/2014 | Fujisawa | B41J 11/00214 347/16 |
| 2015/0224793 | A1* | 8/2015 | Tsuchiya | C09D 11/101 347/102 |
| 2022/0194103 | A1 | 6/2022 | Ishihara | |

FOREIGN PATENT DOCUMENTS

| | | | | | |
|---|---|---|---|---|---|
| JP | 2019181926 | A | * | 10/2019 | B41J 11/00212 |
| JP | 7016994 | | | 2/2022 | |
| KR | 102054110 | B1 | * | 12/2019 | B41J 29/38 |
| WO | WO-2021048953 | A1 | * | 3/2021 | B41J 2/2117 |

* cited by examiner

PRINTING APPARATUS AND PRINTING METHOD

The present application is based on, and claims priority from JP Application Serial Number 2022-100957, filed on Jun. 23, 2022, the disclosure of which is hereby incorporated by reference herein in its entirety.

BACKGROUND

1. Technical Field

The present disclosure relates to a printing apparatus and a printing method.

2. Related Art

In the related art, there is known a printing apparatus using ink that is cured with irradiation of ultraviolet light. For example, a printing apparatus disclosed in JP-A-2009-202418 includes a plurality of light sources of ultraviolet light, and controls the emission intensity of ultraviolet light from the light sources of ultraviolet light. With configuration, timing of emitting ultraviolet light after ink is attached on the medium is controlled to adjust the flatness of the ink surface.

However, in a case of the printing apparatus disclosed in JP-A-2009-202418, the light sources of ultraviolet light need to be larger than the printing head in order to be able to adjust the timing of emitting ultraviolet light or the like. This leads to a problem in that it is difficult to simplify the device that emits ultraviolet light or the structure of the carriage.

SUMMARY

One aspect that solves the problem described above is a printing apparatus including: a carriage including a head including a plurality of nozzles and configured to move in a first direction along a first axis, the plurality of nozzles being configured to discharge ink toward a medium, and a light emission unit configured to move in a second direction relative to the head and emit ultraviolet light toward the medium, the second direction being a direction along a second axis intersecting the first axis, and a control unit, in which the light emission unit includes a first emission group and a second emission group arranged in the second direction, the first emission group is disposed at a position that overlaps with the plurality of nozzles in the first direction, the second emission group is disposed at a position that does not overlap with the plurality of nozzles in the first direction, and the control unit is configured to perform a first mode in which ultraviolet light is emitted from the first emission group and the second emission group, and a second mode in which ultraviolet light is not emitted from the first emission group and ultraviolet light is emitted from the second emission group.

DESCRIPTION OF EXEMPLARY EMBODIMENTS

Below, a printing apparatus 1 according to an embodiment will be described with reference to the drawings.

1. Overall Configuration of Printing Apparatus

Figure 1:
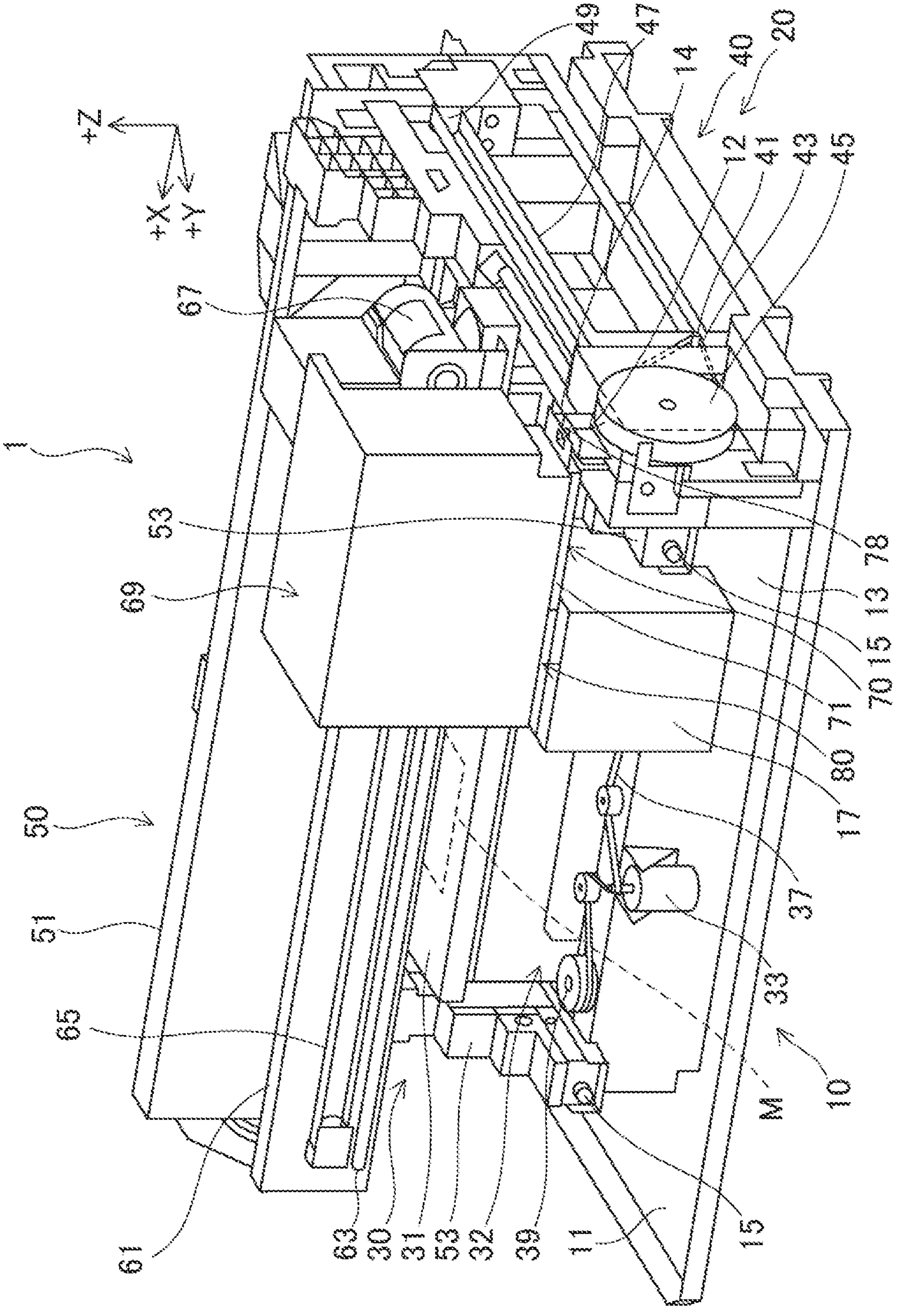
FIG. 1 is a perspective view illustrating a printing apparatus according to an embodiment.

FIG. 1 is a perspective view illustrating the printing apparatus 1.

The printing apparatus 1 illustrated in FIG. 1 is an apparatus configured to discharge ink to a medium M placed at a table 31, and emit ultraviolet light toward the medium M to cure ink attached at the medium M, thereby performing printing. The medium M is a sheet, cloth, or a solid object. The sheet may be a sheet made of paper or synthetic resin. The cloth may include any one of nonwoven fabric, a knit, or a fabric. The solid object includes ornaments such as clothes and shoes, daily necessities, mechanical components, and other various types of objects.

The X-axis, the Y-axis, and the Z-axis are illustrated in FIG. 1. The X-axis, the Y-axis, and the Z-axis are perpendicular to each other. The Z-axis is an axis extending in the up-down direction, and can be said that the Z-axis is an axis extending in the vertical direction. The X-axis and the Y-axis are parallel to the horizontal plane. In the following description, a direction along the X-axis is referred to as a left-right direction, and a direction along the Y-axis is referred to as a front-rear direction. Specifically, the positive direction along the Z-axis is referred to as an upward direction, the positive direction along the X-axis is referred to as a right direction, and the positive direction along the Y-axis is referred to as a frontward direction. In each of the drawings described later, the X-axis, the Y-axis, and the Z-axis in FIG. 1 each indicate the same direction. Note that the X-axis corresponds to one example of a first axis, and the Y-axis corresponds to one example of a second axis. In addition, the left-right direction corresponds to one example of a first direction, and the front-rear direction corresponds to one example of a second direction.

The printing apparatus 1 includes the table 31 configured to support the medium M. The table 31 is a base that does not move in the front-rear direction or the left-right direction. The table 31 supports the medium M at a flat upper surface thereof. The printing apparatus 1 uses the table 31 to support the medium M so as not to move, and causes a carriage 69 to scan over the medium M supported at the table. The carriage 69 is mounted with a head 80 and a light emission unit 70, each of which will be described later, arranged in the left-right direction, and after ink is discharged from the head 80 toward the medium M, ultraviolet light is emitted from the light emission unit 70 to the ink attached at the medium M.

The printing apparatus 1 includes a main body portion 10 and a moving unit 50. The main body portion 10 is a base fixed to an installation surface of the printing apparatus 1. The moving unit 50 moves along the Y-axis relative to the main body portion 10.

The main body portion 10 includes a bottom plate 11, a base portion 13, a medium supporting mechanism 30, and a driving mechanism 20. The bottom plate 11 is a sheet-like member fixed to the installation surface of the printing apparatus 1. The base portion 13 is supported at the upper surface of the bottom plate 11, and supports each component of the printing apparatus 1.

The medium supporting mechanism 30 includes the table 31 and a height moving mechanism 32. The table 31 includes a rectangle flat plate serving as an upper surface, and leg portions disposed at four corners of the flat plate and extending downward from the flat plate.

The height moving mechanism 32 includes an ascending-descending motor 33, an ascending-descending belt 37, and an ascending-descending mechanism 39, and is configured to move the table 31 in a direction along the Z-axis. The ascending-descending mechanism 39 is provided at each of the four leg portions of the table 31. The ascending-descending mechanism 39 includes a ball screw disposed along the Z-axis, a nut engaging with the ball screw, and a pulley. The ball screw of the ascending-descending mechanism 39 is rotatably supported by the base portion 13. The nut of the ascending-descending mechanism 39 is fixed to the leg portion of the table 31. The pulley of the ascending-descending mechanism 39 is fixed at an upper portion of the ball screw. As the pulley of the ascending-descending mechanism 39 rotates, the ball screw rotates, and in association with the rotation of the ball screw, the table together with the nut moves along the Z-axis.

The ascending-descending motor 33 is a motor configured to rotate in accordance with control of a control unit 90 that will be described later. The control unit 90 controls the rotational direction of and the amount of rotation of the ascending-descending motor 33. The ascending-descending belt 37 is a loop-shaped belt stretched over an output shaft of the ascending-descending motor 33 and pulleys of four ascending-descending mechanisms 39. As the ascending-descending motor 33 rotates, the ascending-descending belt 37 is circularly driven. The ascending-descending belt 37 transmits the rotation of the ascending-descending motor 33 to the pulleys of the four ascending-descending mechanisms 39. This causes the ball screw of the ascending-descending mechanism 39 to rotate to move the table 31 along the Z-axis.

The rotational direction of the ascending-descending motor 33 can be switched between the positive direction used to move the table 31 upward and the reverse direction used to move the table 31 downward. By operating the ascending-descending motor 33, the printing apparatus 1 causes the table 31 to ascend and descend.

By varying the height of the table 31 in this manner, the printing apparatus 1 adjusts the distance between the medium M and a nozzle section 83 of the head 80 that will be described later, to be an optimum distance for printing.

The driving mechanism 20 includes a pair of guide shafts 15 and a frame driving unit 40. The pair of guide shafts are shaft-shaped members extending across the pair of base portions 13 and disposed along the Y-axis.

The moving unit 50 includes a main frame 51 and a pair of frame leg portions 53.

The main frame 51 is a plate member elongated in a direction along the X-axis. The pair of frame leg portions 53 are supported by the pair of guide shafts 15 so as to be able to each move in the front-rear direction. The main frame 51 is fixed above the pair of frame leg portions 53, and are supported from below by the pair of frame leg portions 53. The main frame 51 together with the pair of frame leg portions 53 is guided by the guide shafts 15, and moves along the Y-axis.

The frame driving unit 40 includes a frame moving motor 41, a transmission belt 43, a speed changing mechanism 45, and a transmission belt 47.

The frame moving motor 41 is a motor configured to rotate in accordance with control by the control unit 90 that will be described later. The transmission belt 43 is a loop-shaped belt stretched over an output shaft of the frame moving motor 41 and the speed changing mechanism 45, and transmits driving force of the frame moving motor 41 to the speed changing mechanism 45. The speed changing mechanism 45 includes a first pulley and a second pulley. The transmission belt 43 is wound around the first pulley. The transmission belt 47 is wound around the second pulley. The speed changing mechanism 45 causes the second pulley to rotate with the driving force transmitted from the transmission belt 43 to the first pulley, thereby driving the transmission belt 47. The speed changing mechanism 45 transmits the driving force of the frame moving motor 41 to the transmission belt 47 at a deceleration ratio corresponding to a ratio of diameters of the first pulley and the second pulley.

The transmission belt 47 is a loop-shaped belt stretched over the speed changing mechanism 45 and a pulley 49 disposed at an end portion of the base portion 13 at the −Y direction. The pulley 49 is disposed so as to freely rotate relative to the base portion 13. The transmission belt 47 is disposed along the Y-axis. The frame leg portion 53 is fixed to the transmission belt 47. Thus, as the transmission belt 47 is circularly driven, power that causes the frame leg portion 53 to move along the Y-axis works. With this configuration, the moving unit 50 moves along the Y-axis.

The rotational direction of the frame moving motor 41 can be switched between the positive direction used to move the main frame 51 in the +Y direction and the reverse direction used to move the main frame 51 in the −Y direction. By operating the frame moving motor 41, the printing apparatus 1 causes the main frame 51 to move in the frontward direction and the rearward direction.

A carriage supporting frame 61, a carriage guide shaft 63, a carriage driving motor 67, and the carriage 69 are mounted at the main frame 51. The carriage 69 includes the head 80 and the light emission unit 70 that will be described later.

The carriage supporting frame 61 is a plate member elongated in a direction along the X-axis. The carriage guide shaft 63 is fixed along the X-axis to the carriage supporting frame 61. The carriage 69 is supported by the carriage supporting frame 61 and the carriage guide shaft 63, and is able to move along the carriage guide shaft 63. The position of the left end of a range where the carriage 69 moves along the X-axis is referred to as a home position. The main body portion 10 includes a cleaner 17 configured to perform maintenance such as flushing or cleaning of the head 80 at the home position. In FIG. 1, the carriage 69 is located at the home position.

The carriage driving motor 67 is a motor configured to rotate in accordance with control by the control unit 90 that will be described later. The rotation of the carriage driving motor 67 is transmitted to the carriage driving belt 65, and the carriage driving belt 65 is circularly driven.

The carriage driving belt 65 is a loop-shaped belt stretched along the X-axis direction relative to the carriage supporting frame 61. The carriage 69 is coupled to the carriage driving belt 65. Thus, as the carriage driving belt 65 is circularly driven, the carriage 69 moves along the X-axis. Furthermore, as the main frame 51 moves along the Y-axis, the carriage 69 moves in the front-rear direction, that is, in the +Y direction and the −Y direction. Thus, the printing apparatus 1 is able to move the carriage 69 in the front-rear direction and the left-right direction.

As described above, the head 80 is mounted at the carriage 69. Thus, the printing apparatus 1 is able to move the head 80 in the front-rear direction and the left-right direction relative to the table 31. This makes it possible to discharge ink to the entire medium M supported at the table 31. In addition, as described above, the light emission unit 70 is mounted at the carriage 69. Thus, the printing apparatus 1 is able to move the light emission unit 70 in the front-rear direction and the left-right direction.

Figure 2:
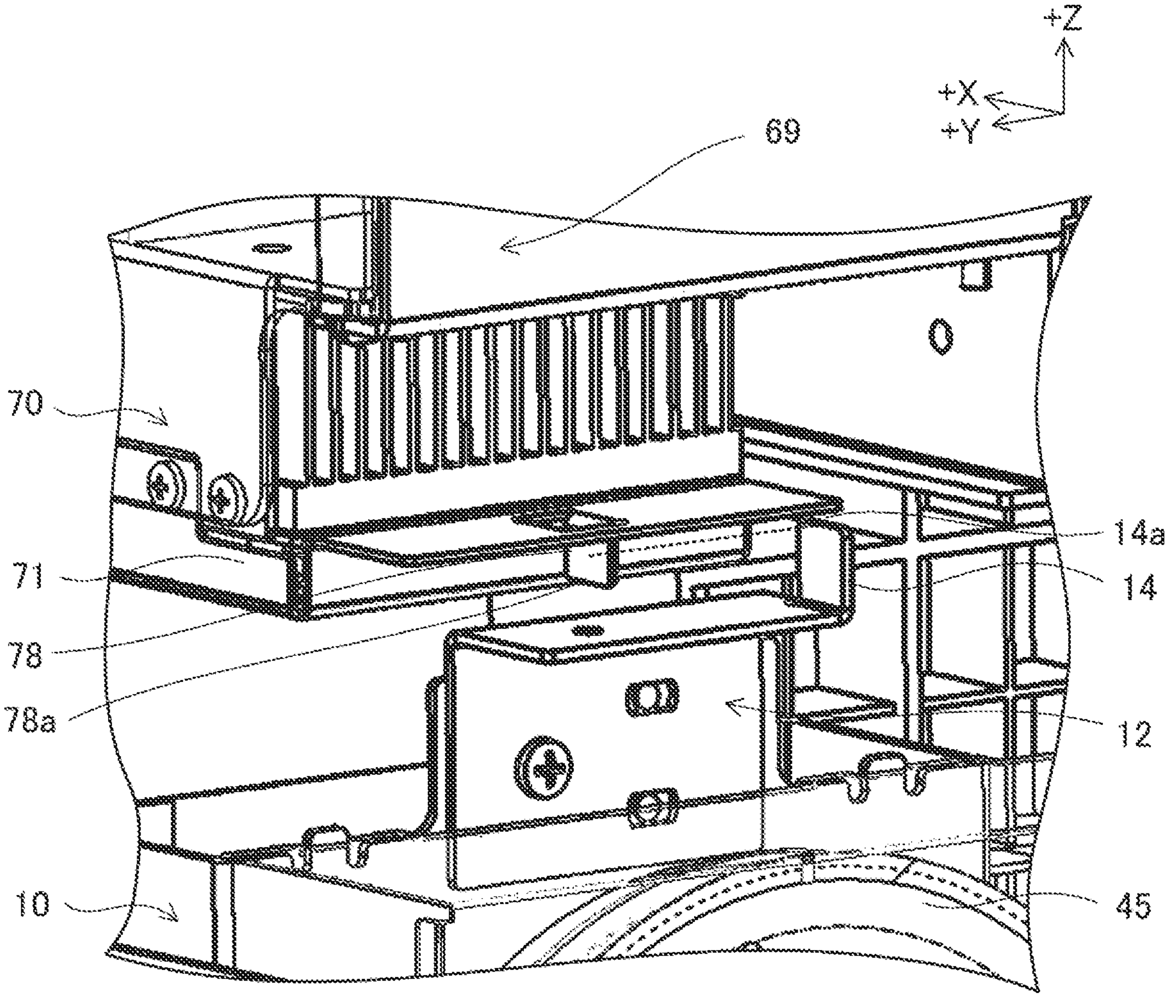
FIG. 2 is a perspective view illustrating the main components of the printing apparatus.

FIG. 2 is a perspective view illustrating the main components of the printing apparatus 1, and illustrates the first contact portion 78 and its vicinity in a state in which the carriage 69 is located at the home position.

The light emission unit 70 includes a first contact portion 78. The first contact portion 78 is a sheet-like protrusion protruding downward. The first contact portion 78 is formed so as to be bent downward from an end portion, at the −X direction, of a housing 71 serving as an outer packaging member covering the lower portion of the light emission unit 70. The housing 71 is formed by bending a plate.

The second contact portion 14 is a sheet metal-shaped protrusion protruding upward. The second contact portion 14 is formed so as to be bent upward from the contact member 12 provided at an end portion of the main body portion 10 at the −X direction. The contact member 12 is a member formed by bending a plate, and is fixed to the main body portion 10 through screw fixing. The contact member 12 does not overlap with the table 31 in the front-rear direction. In addition, the contact member 12 does not overlap with the table 31 in the left-right direction, and is located frontward and obliquely rightward of the table 31. Thus, the second contact portion 14 is located at or around the front end of the main body portion 10.

The first contact portion 78 and the second contact portion 14 are each formed so as to be perpendicular to the Y-axis. In addition, the upper end 14*a* of the second contact portion 14 is located above the lower end 78*a* of the first contact portion 78. In addition, as illustrated in FIGS. 1 and 2, when the carriage 69 is located at the home position, the first contact portion 78 of the light emission unit 70 and the second contact portion 14 of the main body portion 10 overlap in the +X direction.

That is, when the carriage 69 is located at the home position, the first contact portion 78 and a portion of the second contact portion 14 overlap with each other in the front-rear direction. Thus, by moving the moving unit 50 in the front-rear direction in a state where the carriage 69 is located at the home position, the carriage 69 moves in the front-rear direction, and the first contact portion 78 and the second contact portion 14 are in contact with each other.

2. Configuration of Carriage

Figure 3:
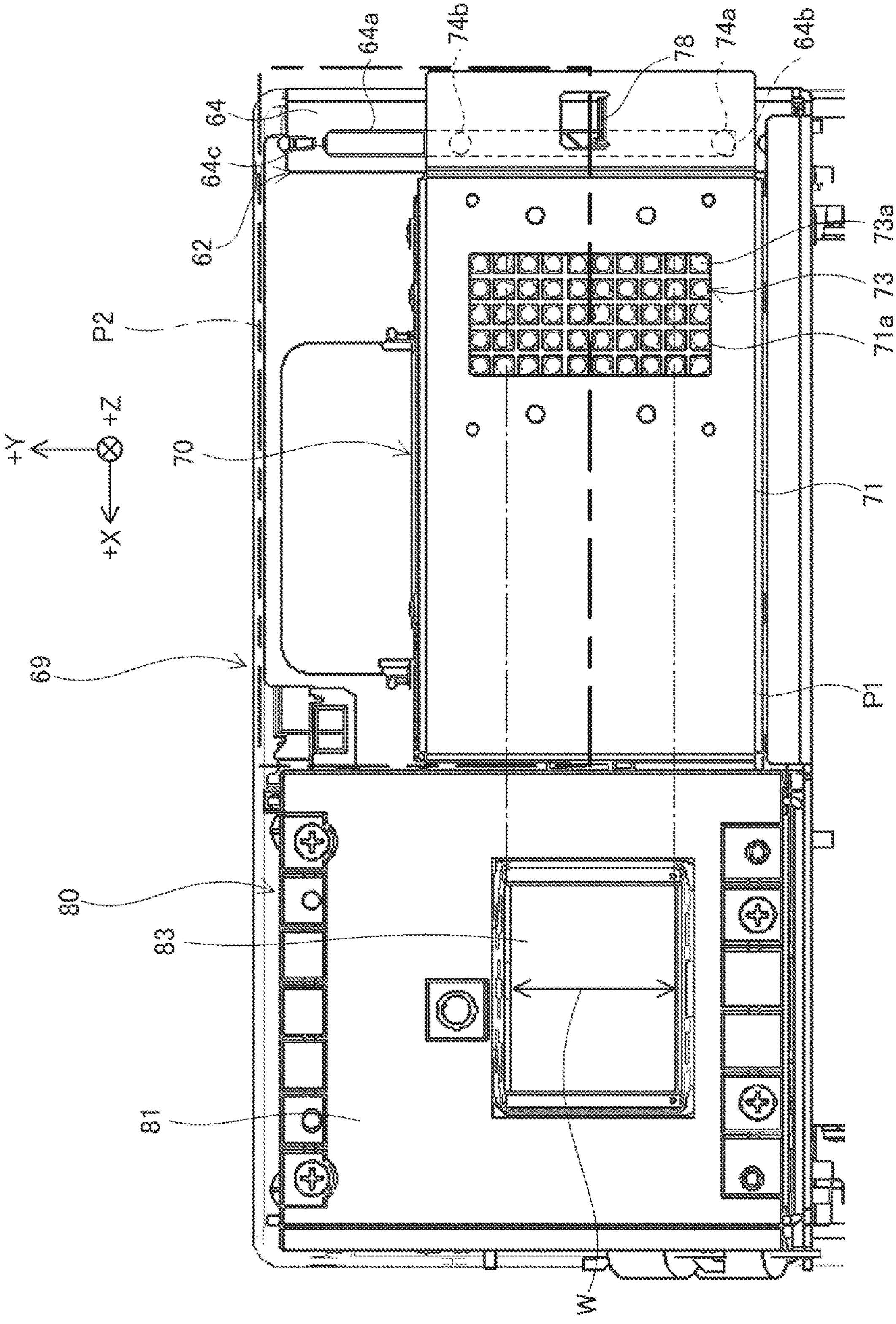
FIG. 3 is a plan view illustrating a carriage.
Figure 4:
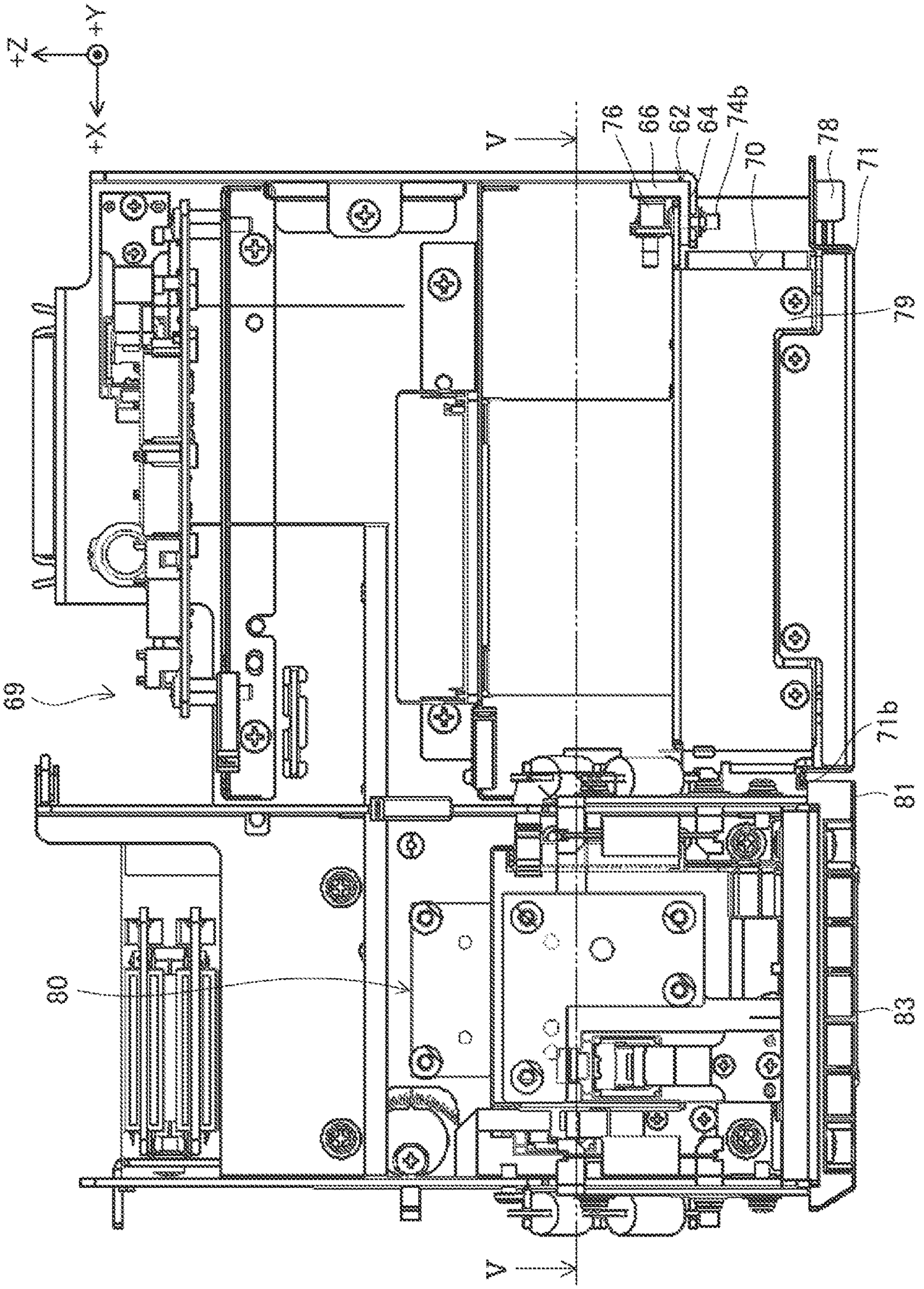
FIG. 4 is a side view illustrating the carriage.
Figure 5:
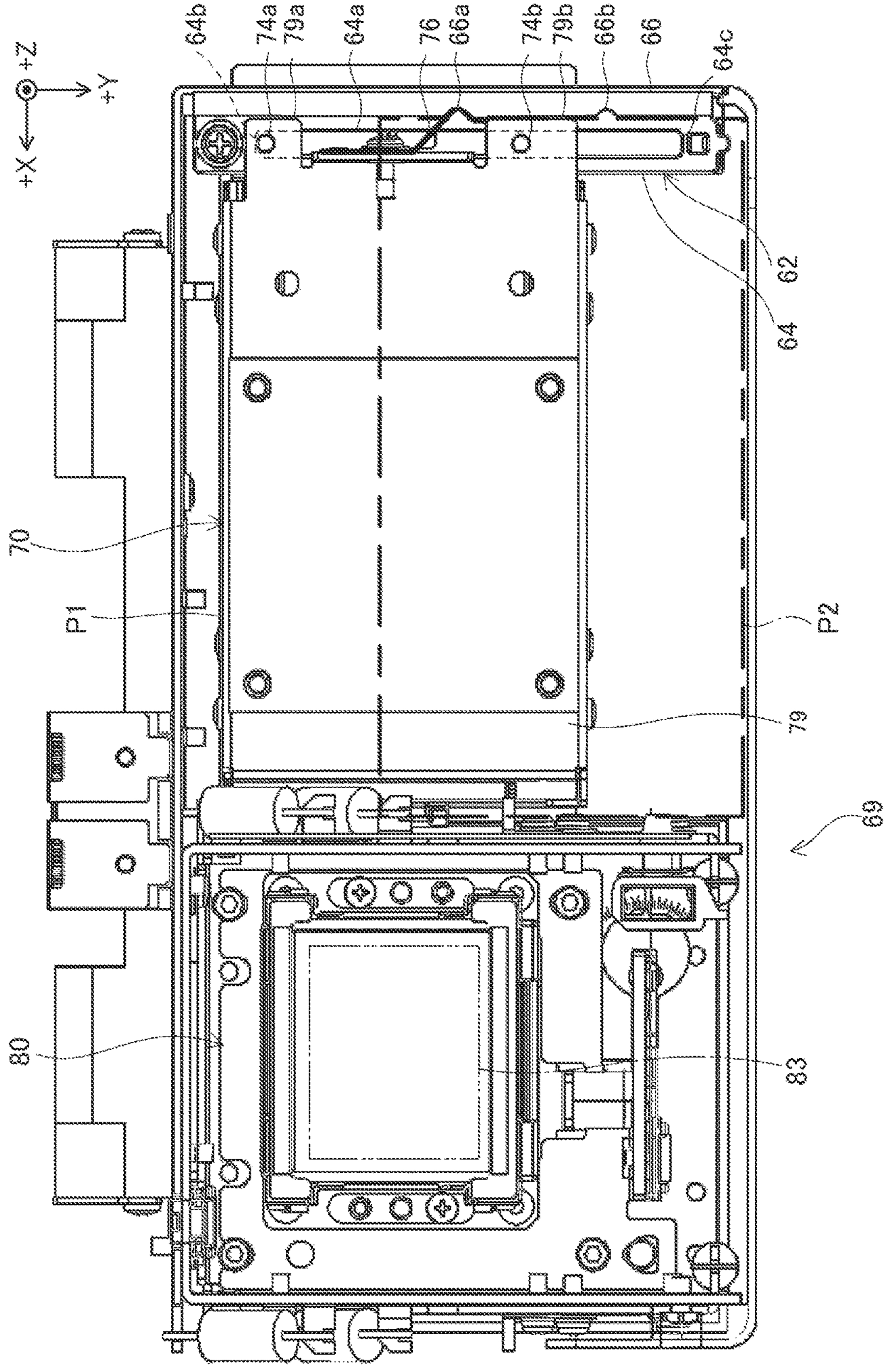
FIG. 5 is a cross-sectional view taken along the V-V in FIG. 4.

FIG. 3 is a plan view illustrating the carriage 69 from below. FIG. 4 is a side view illustrating the carriage 69 as viewed from the front direction. FIG. 5 is a cross-sectional view taken along the V-V in FIG. 4. For the purpose of convenience of explanation, FIG. 4 illustrating a state in which the outer packaging of the carriage 69 is removed.

The carriage 69 includes the head 80, the light emission unit 70, and a guide 62. The head 80 and the light emission unit 70 are mounted at the carriage 69 and arranged in the left-right direction.

The head 80 is a device configured to drive a piezo-actuator, which is not illustrated, to discharge ink. The head is fixed at the outer packaging of the carriage 69, and is disposed at the right side of the carriage 69. A bottom surface panel 81 is provided below the head 80. The bottom surface panel 81 is a substantially rectangular plate provided horizontally, and the center thereof is opened in a rectangle shape as illustrated in FIG. 3. The nozzle section 83 included in the head 80 is exposed from the opening of the bottom surface panel 81. The nozzle section 83 includes a large number of nozzles opened downward, and ink is discharged from each of the nozzles to cause the ink to be attached at the medium M.

As illustrated in FIGS. 3 to 5, the guide 62 is a member fixed at the outer packaging of the carriage 69 with the longitudinal direction thereof extending in the front-rear direction. The guide 62 is provided at an end portion of the carriage 69 at the left side. As illustrated in FIG. 4, the guide 62 is a member having a letter-L shape as viewed from the front direction, and includes a flat sheet-like guide portion 64 provided horizontally, and a flat sheet-like holding unit 66 extending vertically from the end portion of the guide portion 64 at the −X direction.

In the guide portion 64, a guide hole 64*a* that is a hole having a substantially rectangular shape extending in the front-rear direction is formed. As illustrated in FIG. 5, a first recessed portion 66*a* and a second recessed portion 66*b*, each of which is a recess having a shape recessed in the −X direction side, are formed in a surface of the holding unit 66 opposed in the +X direction. The first recessed portion 66*a* is formed at or around the center of the holding unit 66, and the second recessed portion 66*b* is formed at the front side of the first recessed portion 66*a*.

The light emission unit 70 is disposed at the −X direction side of the carriage 69. As illustrated in FIG. 4, the light emission unit 70 include a case 79 serving as an outer packaging member that covers the upper portion of the light emission unit 70, and the housing 71 serving as an outer packaging member that covers the lower portion of the light emission unit 70.

The light emission unit 70 includes an emission port 71*a* facing downward. The emission port 71*a* is a rectangular hole formed such that the housing 71 is opened. The emission port 71*a* is covered with a plate glass from the inner side of the housing 71. A UV light source 73 provided at the inner side of the housing 71 is configured such that a plurality of light-emitting elements 73*a* are arrayed in the X-axis direction and the Y-axis direction. The light-emitting elements 73*a* are light sources configured to emit light in an ultraviolet region, and are, for example, ultraviolet light-emitting diodes (UV-LED). The ultraviolet light emitted by the light-emitting elements 73*a* is emitted through the plate glass and the emission port 71*a* to the medium M mounted below the housing 71. Note that the UV light source 73 is formed by emitting ultraviolet light. The UV light source 73 may be configured such that a cover lens made of synthetic resin is mounted at each of the light-emitting elements 73*a*, or may be configured so as to include one or a plurality of cover lenses that cover the plurality of light-emitting elements 73*a*, or may be configured such that the light-emitting elements 73*a* are exposed at the inner side of the plate glass. In addition, the light emission unit 70 may be configured to include emission ports 71*a*, the number of which is equal to the number of the light-emitting elements 73*a*, the emission ports 71*a* each corresponding to the light-emitting elements 73*a*, or the light emission unit 70 may be configured such that one emission port 71*a* is opened at a region that overlaps with the plurality of light-emitting elements 73*a*.

As illustrated in FIGS. 4 and 5, a first protrusion 79*a* and a second protrusion 79*b* are formed at an end portion, at the left side, of the case 79. The first protrusion 79*a* and the second protrusion 79*b* both protrude toward the left direction. The first protrusion 79*a* includes a first guide pin 74*a* protruding downward. The second protrusion 79*b* includes a second guide pin 74*b* protruding downward. The first guide pin 74*a* and the second guide pin 74*b* may be referred to as “guide pins”. The first guide pin 74*a* and the second guide pin 74*b* are pins each having a cylindrical shape, and are arranged in the front-rear direction. The first guide pin 74*a* and the second guide pin 74*b* are each fitted in the guide hole 64*a* of the guide 62. Thus, the left-side end portion of the light emission unit 70 is supported by the guide 62 so as to be able to move in the front-rear direction relative to the carriage 69.

Furthermore, as illustrated in FIG. 4, a sliding member 71*b* is provided at the right-side end portion of the housing 71. The sliding member 71*b* is a member attached at the edge of the right-side end portion of the housing 71. The sliding member 71*b* protrudes and expands downward from the edge of the right-side end portion. The sliding member 71*b* is in contact, from above, with the left-side end portion of the upper surface of the bottom surface panel 81 of the head 80. With this configuration, the right-side end portion of the light emission unit 70 is supported by the bottom surface panel 81 so as to be able to move in the front-rear direction relative to the carriage 69.

Thus, the light emission unit 70 is supported by the guide 62 and the bottom surface panel 81 so as to be able to move in the front-rear direction relative to the head 80.

Furthermore, a plate spring 76 is fixed at the left-side end portion of the case 79, as illustrated in FIG. 5. The plate spring 76 is a compression spring provided between the left-side end portion of the case 79 and the holding unit 66 and configured to flex in the left-right direction. The plate spring 76 is formed by being bent so as to be fitted in the first recessed portion 66*a* and the second recessed portion 66*b*. With the plate spring 76 being fitted in the first recessed portion 66*a* or the second recessed portion 66*b*, the light emission unit 70 is fixed so as not to move relative to the head 80.

FIGS. 3 to 5 illustrate the carriage 69 in a state where the plate spring 76 is fitted in the first recessed portion 66*a*. The relative position of the light emission unit 70 relative to the head 80 in this state is defined as a first relative position P1. When the light emission unit 70 is located at the first relative position P1, the nozzle section 83 of the head 80 as a whole overlaps with the emission port 71*a* in the Y-axis as illustrated in FIG. 3. In addition, when the light emission unit 70 is located at the first relative position P1, the first guide pin 74*a* is brought into contact with a first contact surface 64*b* that is a rear end of the guide hole 64*a*.

Figure 6:
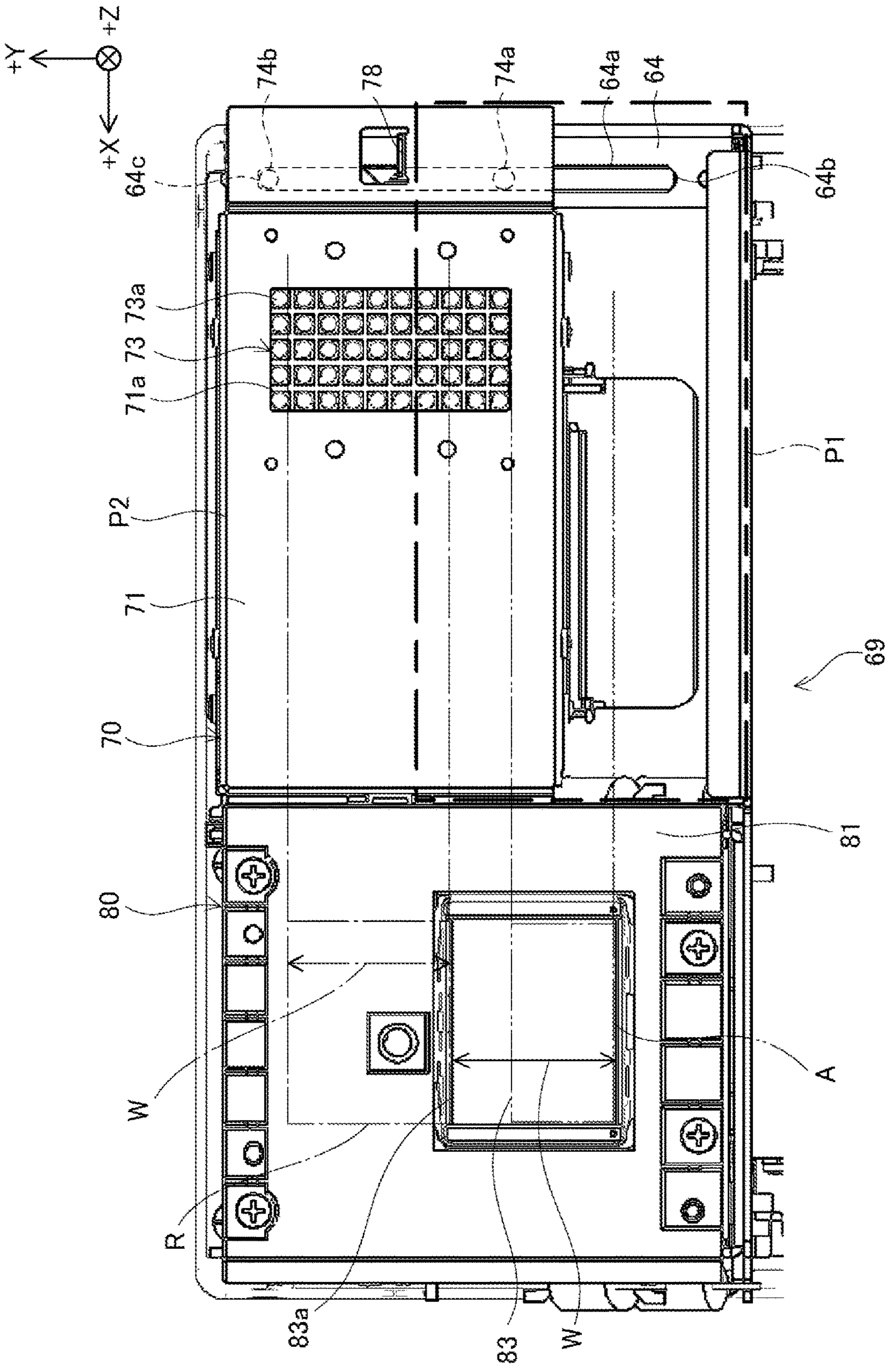
FIG. 6 is a plan view illustrating a carriage.

FIG. 6 is a plan view illustrating the carriage 69, and is a diagram illustrating, as viewed from below, the carriage 69 in a state where the plate spring 76 is fitted in the second recessed portion 66*b*. The relative position of the light emission unit 70 relative to the head 80 in the state illustrated in FIG. 6 is defined as a second relative position P2. When the light emission unit 70 is located at the second relative position P2, the emission port 71*a* does not overlap, in the Y-axis, with a portion A of the nozzle section 83 that is indicated by the imaginary line. However, when the light emission unit 70 is located at the second relative position P2, the emission port 71*a* overlaps with the entire region R in the Y-axis. Here, the region R is a region extending from an end portion 83*a*, at the front side, of the nozzle section 83 toward the front direction by the distance W. In addition, the distance W is equal to the size of the nozzle section 83 in the front-rear direction.

Furthermore, when the light emission unit 70 is located at the second relative position P2, the second guide pin 74*b* is brought into contact with a second contact surface 64*c* that is a front end of the guide hole 64*a*. The first contact surface 64*b* and the second contact surface 64*c* may be referred to as “contact surfaces”.

Figure 7:
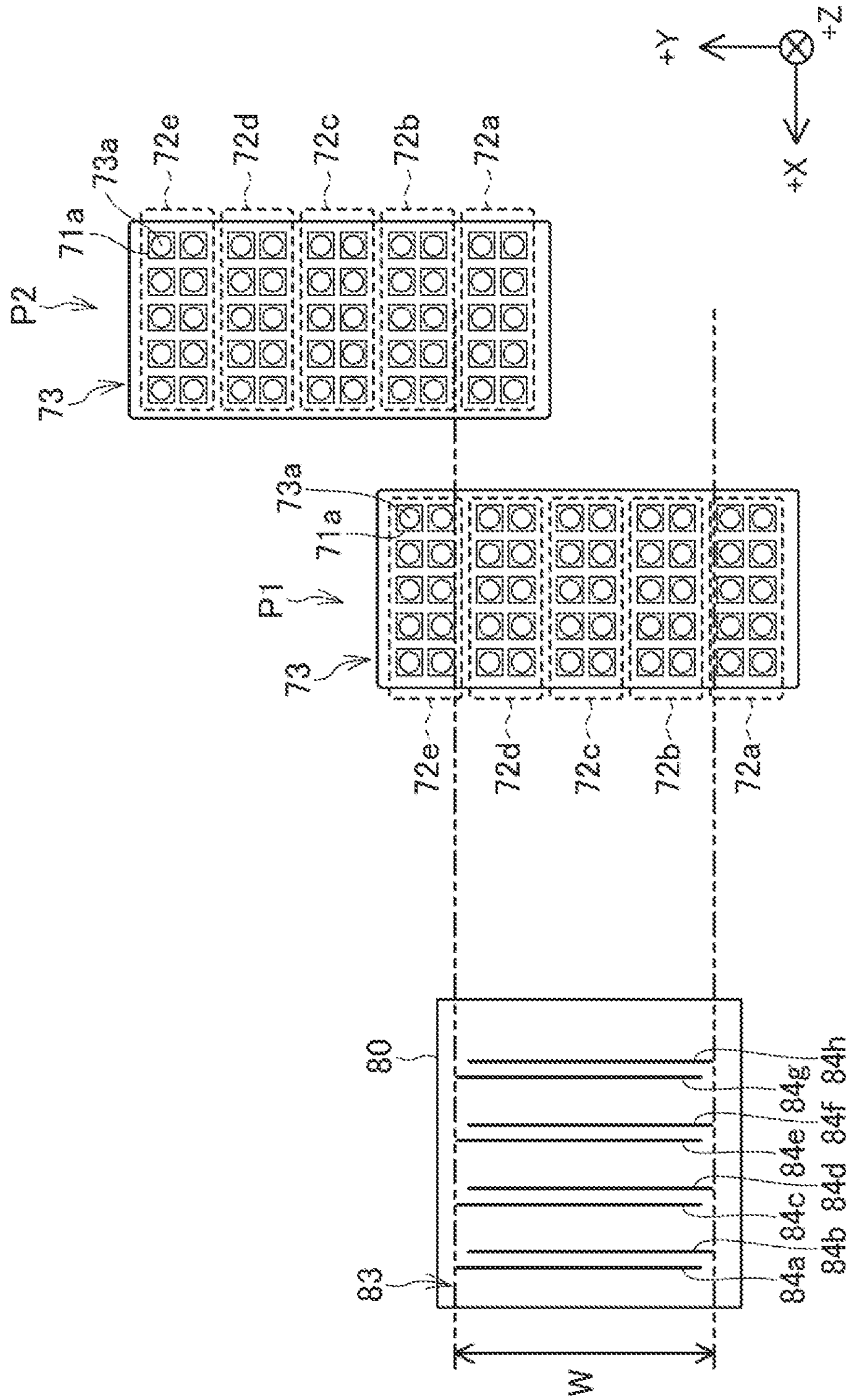
FIG. 7 is a schematic view illustrating a relative positional relationship between a head and UV light source.

FIG. 7 is a schematic view illustrating a relative positional relationship between the head 80 and the UV light source 73.

FIG. 7 illustrates the positional relationship between the head 80 and the light emission unit 70 in the +Y direction in terms of the first relative position P1 and the second relative position P2. For the purpose of convenience of explanation, the position of the light emission unit 70 in the +X direction differs from those in the other drawings.

The UV light source 73 includes the plurality of light-emitting elements 73*a* as described above. The light-emitting element 73*a* included in the UV light source 73 is categorized into a plurality of LED groups 72. FIG. 7 illustrates an example in which the UV light source 73 is categorized into five LED groups 72*a*, 72*b*, 72*c*, 72*d*, and 72*e*. When the LED groups 72*a* to 72*e* are not separately treated, they are each referred to as an LED group 72.

Each of the LED groups 72 includes the plurality of light-emitting elements 73*a*. In the present embodiment, the LED groups 72*a* to 72*e* each include ten light-emitting elements 73*a* in total in two rows in the +X direction and five columns in the +Y direction. In the UV light source 73, the LED groups 72 are arranged in the +Y direction in the order of the LED groups 72*a*, 72*b*, 72*c*, 72*d*, and 72*e*.

In addition, in the nozzle section 83, a plurality of nozzle rows 84 are arranged. FIG. 7 illustrates an example in which eight columns of nozzle rows 84*a*, 84*b*, 84*c*, 84*d*, 84*e*, 84*f*, 84*g*, and 84*h* are arranged. When the nozzle row 84*a* to nozzle row 84*h* are not separately treated, they are each referred to as a nozzle row 84.

The nozzle row 84 has a configuration in which a plurality of nozzles are arranged in the +Y direction in a straight manner. The nozzle row 84 may be configured with nozzles arranged in one line or may be configured with nozzles arranged in a plurality of lines. The nozzle rows 84*a* to 84*h* each discharge ink used by the printing apparatus 1 to perform printing. For example, in a configuration in which the printing apparatus 1 performs full-color printing, the nozzle rows 84*a*, 84*b*, 84*c*, and 84*d* discharge ink of cyan (C), magenta (M), yellow (Y), and black (K), respectively, which are used by the printing apparatus 1. Each of these ink colors is merely one example, and the printing apparatus 1 may be configured to use ink of half tone or light color.

As with the nozzle rows 84*a* to 84*d*, ink for color printing may be assigned to the nozzle rows 84*e*, 84*f*, 84*g*, and 84*h*. In the present embodiment, the nozzle rows 84*e* and 84*f* discharge ink of white (W), and the nozzle rows 84*g* and 84*h* discharge transparent ink. The transparent ink is also called varnish ink. Below, ink of cyan, magenta, yellow, black, or the like other than the transparent ink is referred to as color ink. The printing apparatus 1 uses the nozzle rows 84*g* and 84*h* to discharge the transparent ink so as to overlap with the color ink, thereby forming a transparent coating layer on the color ink.

In the +Y direction, the region where nozzles of the nozzle rows 84*a* to 84*h* are opened corresponds to the distance W. When the light emission unit 70 is located at the first relative position P1, the entire region of the distance W overlaps with the UV light source 73 in the +Y direction. For example, as illustrated in FIG. 7, the LED groups 72*b*, 72*c*, and 72*d* overlap with the nozzle row 84 in the +Y direction.

On the other hand, when the light emission unit 70 is located at the second relative position P2, at least a portion of the region of the distance W does not overlap with the UV light source 73. In other words, the LED groups 72 that overlap with the region of the width W of the nozzle section 83 are a portion of the LED groups 72 that the UV light source 73 includes. For example, as illustrated in FIG. 7, only the LED group 72*a* overlaps with the nozzle row 84 in the +Y direction, and the LED groups 72*b* to 72*e* do not overlap with the nozzle row 84.

3. Printing Operation

Figure 8:
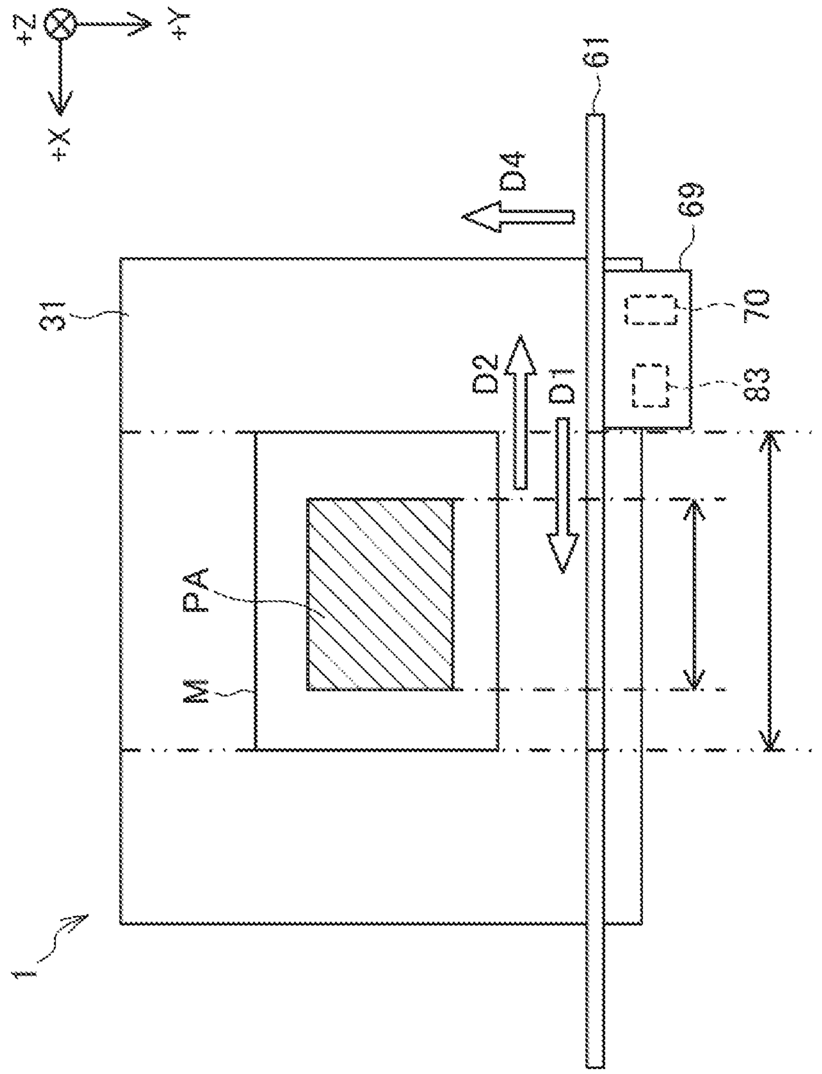
FIG. 8 is an explanatory diagram illustrating printing operation by the printing apparatus.

FIG. 8 is an explanatory diagram illustrating a printing operation by the printing apparatus 1. FIG. 8 is a plan view illustrating, from above, the main components including the table 31 of the printing apparatus 1.

FIG. 8 illustrates an example in which a rectangle medium M is mounted at the table 31, and ink is caused to be attached in a printing area PA of the medium M. The position of the carriage 69 in FIG. 8 is a position before printing starts. Before printing starts, the carriage 69 is located at the home position in the +X direction, and the carriage supporting frame 61 is located at an end portion in the +Y direction.

The printing apparatus 1 uses the control unit 90 to control each component of the printing apparatus 1 as described later, to perform the printing operation.

The printing apparatus 1 causes the frame moving motor 41 to operate to move the carriage 69 together with the carriage supporting frame 61 in the −Y direction. When the position of the nozzle section 83 in the −Y direction reaches the position that overlaps with the printing area PA, the printing apparatus 1 stops the movement of the carriage 69 toward the −Y direction. Then, the printing apparatus 1 uses the power of the carriage driving motor 67 to move the carriage 69 toward the +X direction. When the position of the nozzle section 83 in the +X direction reaches the position that overlaps with the printing area PA, the printing apparatus 1 starts to discharge ink from the nozzle section 83. When the nozzle section 83 reaches a position that deviates from the printing area PA in the +X direction, the printing apparatus 1 stops discharging the ink, and stops the movement of the carriage 69.

Here, the printing apparatus 1 operates the frame moving motor 41 to move the carriage supporting frame 61 together with the carriage 69 in the −Y direction by a predetermined amount. The first movement of the carriage 69 in the −Y direction by the predetermined amount is referred to as a carriage return operation D4. The printing apparatus 1 moves the carriage 69 in the −X direction using the power of the carriage driving motor 67. When the position of the nozzle section 83 in the −X direction reaches the position that overlaps with the printing area PA, the printing apparatus 1 starts to discharge ink from the nozzle section 83. When the nozzle section 83 reaches a position that deviates from the printing area PA in the −X direction, the printing apparatus 1 stops discharging the ink, and stops the movement of the carriage 69.

In this manner, the printing apparatus 1 discharges ink from the nozzle section 83 while moving the carriage 69 in the +X direction. The first movement in the +X direction that involves discharging the ink is referred to as a pass D1. In addition, the printing apparatus 1 discharges ink from the nozzle section 83 while moving the carriage 69 in the −X direction. The first movement in the −X direction that involves discharging the ink is referred to as a pass D2. The printing apparatus 1 may be configured such that only printing with the pass D1 is performed, and printing with the pass D2 is not performed. For example, the printing apparatus 1 performs the carriage return operation D4 every time the pass D1 is performed and every time the pass D2 is performed. By combining the pass D1 and/or the pass D2 with the carriage return operation D4 to perform them in this manner, the printing apparatus 1 performs printing on the medium M having a predetermined size in the +Y direction and the +X direction.

In the pass D1 and the pass D2, the printing apparatus 1 emits ultraviolet light using the light emission unit 70. The light emission unit 70 is located at the −X direction side of the nozzle section 83. Thus, when emission is performed by the light emission unit 70 during printing with the pass D1, ink discharged from the nozzle section 83 and attached at the medium M is irradiated with ultraviolet light from the light emission unit 70 immediately after the nozzle section 83. Furthermore, the ink attached at the medium M at the time of printing with the pass D2 is then irradiated with ultraviolet light by the light emission unit 70 when the carriage 69 moves in the −X direction or the +X direction next time. In this case, it may be possible to employ a configuration in which, after performing printing with the pass D2, the printing apparatus 1 emits ultraviolet light using the light emission unit 70 while moving the carriage 69 in the −X direction or the +X direction without performing the carriage return operation D4.

The number of times of the pass D1, D2 performed by the printing apparatus 1 to perform printing to the entire printing area PA is determined based on the displacement of the carriage return operation D4 and the size of the printing area PA. By varying the carriage return operation D4, the printing apparatus 1 is able to change the number of times of the pass D1, D2. In other words, by varying the displacement of the carriage return operation D4, the printing apparatus 1 is able to change the number of times of the pass D1, D2 per unit area of the printing area PA.

The total number of times of the pass D1 and the pass D2 necessary to perform printing on the printing area PA is referred to as the number of times of printing pass. When the printing apparatus 1 does not perform the pass D2, the number of times of printing pass is the total number of times of the pass D1. For example, the printing apparatus 1 is able to change the displacement of the carriage return operation D4 in two steps, three steps, or more steps, or may be able to change the displacement of the carriage return operation D4 in a continuous manner.

When the number of times of printing pass is large, the number of times that the light emission unit 70 moves over the printing area PA is large, which makes it possible to increase the total amount of ultraviolet light that the light emission unit 70 emits on the printing area PA. The total amount of ultraviolet light necessary to reliably cure ink on the printing area PA is determined based on the amount of ink discharged and the size of the printing area PA. In other words, the total amount of ultraviolet light that should be emitted to the printing area PA is determined independently of the number of times of printing pass. Thus, the amount of ultraviolet light emitted in each pass D1, D2 may be reduced with increase in the number of times of printing pass. That is, it may be possible to reduce the amount of ultraviolet light that the light emission unit 70 emits per unit time.

In addition, as will be described later, by varying the rotational speed of the carriage driving motor 67, the printing apparatus 1 is able to vary the movement velocity of the carriage 69 in the pass D1 and the pass D2. As the movement velocity of the carriage 69 reduces, the period of time when the light emission unit 70 stays above the printing area PA increases. This results in an increase in the amount of emission of ultraviolet light emitted by the light emission unit to the printing area PA. In other words, as the movement velocity of the carriage 69 reduces, it may be possible to reduce the amount of ultraviolet light that the light emission unit 70 emits per unit time. The movement velocity of the carriage 69 can be regarded as the movement velocity of the head and corresponds to one example of a head movement velocity.

During the printing operation being performed, the period of time from a time when the nozzle section 83 discharges ink to the medium M to a time when ultraviolet light is emitted from the emission port 71*a* onto the ink attached on the medium M affects the quality of printing. This period of time is temporarily referred to as a pre-emission period.

The ink discharged from the nozzle section 83 turns into an ink droplet, and lands on the front surface of the medium M. Immediately after landing, the ink droplet is raised, and unevenness exists on the front surface of the ink. Then, the ink droplet gets flattened as time goes by, and the front surface of the ink becomes flat. The period of time from landing of the ink droplet on the medium M until the front surface of the ink droplet gets flattened is determined in accordance with the viscosity of the ink.

When the pre-emission period is long, the ink droplet attached on the front surface of the medium M is flattened before being cured through irradiation with ultraviolet light. Thus, as the pre-emission period increases, the ink droplet is cured in a flattened state, which makes it possible to obtain a highly glossy printed matter. On the other hand, when the pre-emission period is short, the ink droplet on the front surface of the medium M is cured in a state of not being sufficiently flattened. Thus, when the pre-emission period is short, the ink drop is fixed in a state where unevenness exists on the front surface of the ink drop, which makes it possible to obtain a less glossy printed matter.

The printing apparatus 1 is able to perform a printing mode in which ink is flattened and then is cured. This printing mode is referred to as gloss printing. In addition, the printing apparatus 1 is able to perform a printing mode in which ink is cured in a state of not being sufficiently flattened. This printing mode is referred to as matte printing. By varying the pre-emission period, the printing apparatus 1 is able to switch between the matte printing and the gloss printing.

The pre-emission period varies depending on the positional relationship between the nozzle section 83 and the UV light source 73.

When the matte printing is performed, the printing apparatus 1 performs discharging ink and emitting ultraviolet light in one pass D1. In this case, the light emission unit 70 is located at the first relative position P1. In this pass D1, ink discharged from the nozzle section 83 to the medium M is irradiated with ultraviolet light by the light emission unit 70 passing over the ink immediately after the nozzle section 83. In this case, as the pre-emission period is short, the printed matter has a less glossy matte finish.

In addition, when the gloss printing is performed, the printing apparatus 1 discharges ink in the first pass D1, and then, emits ultraviolet light by the light emission unit 70 in the next pass D2 or in the second pass D1. In the first pass D1, ink discharged from the nozzle section 83 to the medium M is not irradiated with the ultraviolet light by the light emission unit 70 passing over the ink immediately after the nozzle section 83. Thus, as the pre-emission period is long, it is possible to achieve gloss printing with a high gloss.

It may be possible to consider an operation of, in the first pass D1, discharging ink and stopping operation of the light emission unit 70 in order to perform the gloss printing. This operation makes it possible to achieve a state where, until ink is flattened, the ink is reliably not irradiated with ultraviolet light. However, this necessitates the pass D1 or the pass D2 to emit ultraviolet light to the medium M. That is, this operation needs to perform the pass D1 in which ink is discharged and the pass D2 in which ultraviolet light is emitted, or perform the first pass D1 in which ink is discharged and the second pass D1 in which ultraviolet light is emitted, without performing the carriage return operation D4. Such an operation leads to an increase in the period of time required to perform printing.

Thus, when the gloss printing is performed, the printing apparatus 1 moves the light emission unit 70 to the second relative position P2. At the second relative position P2, at least a portion of the LED groups 72 included in the light emission unit 70 is at a position that does not overlap with the nozzle row 84 as described above. In the example in FIG. 7, the LED groups 72*b* to 72*e* do not overlap with the nozzle row 84 in the +Y direction. In a state where the LED group 72*a* is turned off, the printing apparatus 1 turns on the LED groups 72*b* to 72*e* as needed, which makes it possible to achieve the state where ink immediately after landing on the medium M is less likely to be irradiated with ultraviolet light. This configuration makes it possible to perform gloss printing while performing both discharging ink and emitting ultraviolet light in one pass D1.

Furthermore, when the gloss printing is performed, the printing apparatus 1 adjusts the amount of ultraviolet light emitted by the LED groups 72. Specifically, the amount of light from the LED group 72 at a position close to the nozzle row 84 in the +Y direction is set to be lower than the amount of light from the LED group 72 at a position far from the nozzle row 84. This adjustment reduces the influence on ink of the reflected light or leaked light of ultraviolet light emitted by the LED group 72 disposed far from the nozzle row 84. This makes it possible to perform gloss printing with higher gloss. In the example in FIG. 7, the printing apparatus 1 sets the amount of light from the LED group 72*b* to be lower than the amount of light from the LED group 72*c*. In addition, the printing apparatus 1 may set the amount of light from the LED group 72*b* and the LED group 72*c* to be lower than the LED group 72*d*.

In this manner, the printing apparatus 1 varies the lighting state of the LED groups 72 and the light emission intensity of the LED groups 72 between when the matte printing is performed and when the gloss printing is performed. Here, the lighting state of the LED group 72 and the light emission intensity of the LED group 72 are collectively referred to as a lighting mode of the UV light source 73. A lighting mode in which the printing apparatus 1 performs the matte printing is referred to as a first mode, and a lighting mode in which the printing apparatus 1 performs the gloss printing is referred to as a second mode. The first mode is a lighting mode when the light emission unit 70 is located at the first relative position P1, and the second mode is a lighting mode when the light emission unit 70 is located at the second relative position P2. The light emission intensity of the LED group 72 represents the light emission intensity of the light-emitting element 73*a*. Controlling the light emission intensity of the light-emitting element 73*a* can be regarded as controlling the emission intensity of ultraviolet light emitted from the emission port 71*a*. That is, the control unit 90 adjusts the light emission intensity of the light-emitting element 73*a* included in the UV light source 73 and controls it, thereby adjusting and controlling the emission intensity of ultraviolet light emitted from the emission port 71*a* to the medium M.

When the matte printing is performed to the medium M, the printing apparatus 1 performs the matte printing of both the color ink and the transparent ink. In this case, the printing apparatus 1 causes the LED group 72 to turn on in the first mode.

On the other hand, when the gloss printing is performed to the medium M, the printing apparatus 1, for example, performs the matte printing using the color ink and then performs the gloss printing using the transparent ink. The transparent ink is typically discharged so as to be layered over the color ink. Thus, by performing the gloss printing using the transparent ink, the entire region covered with the transparent ink can have a highly glossy finish. For this reason, when the gloss printing is performed, the printing apparatus 1 controls the LED group 72 in the first mode during a period of time when the matte printing using the color ink is first performed, and controls the LED group 72 in the second mode during a period of time when the gloss printing using the transparent ink is performed.

4. Configuration of Control System of Printing Apparatus

Figure 9:
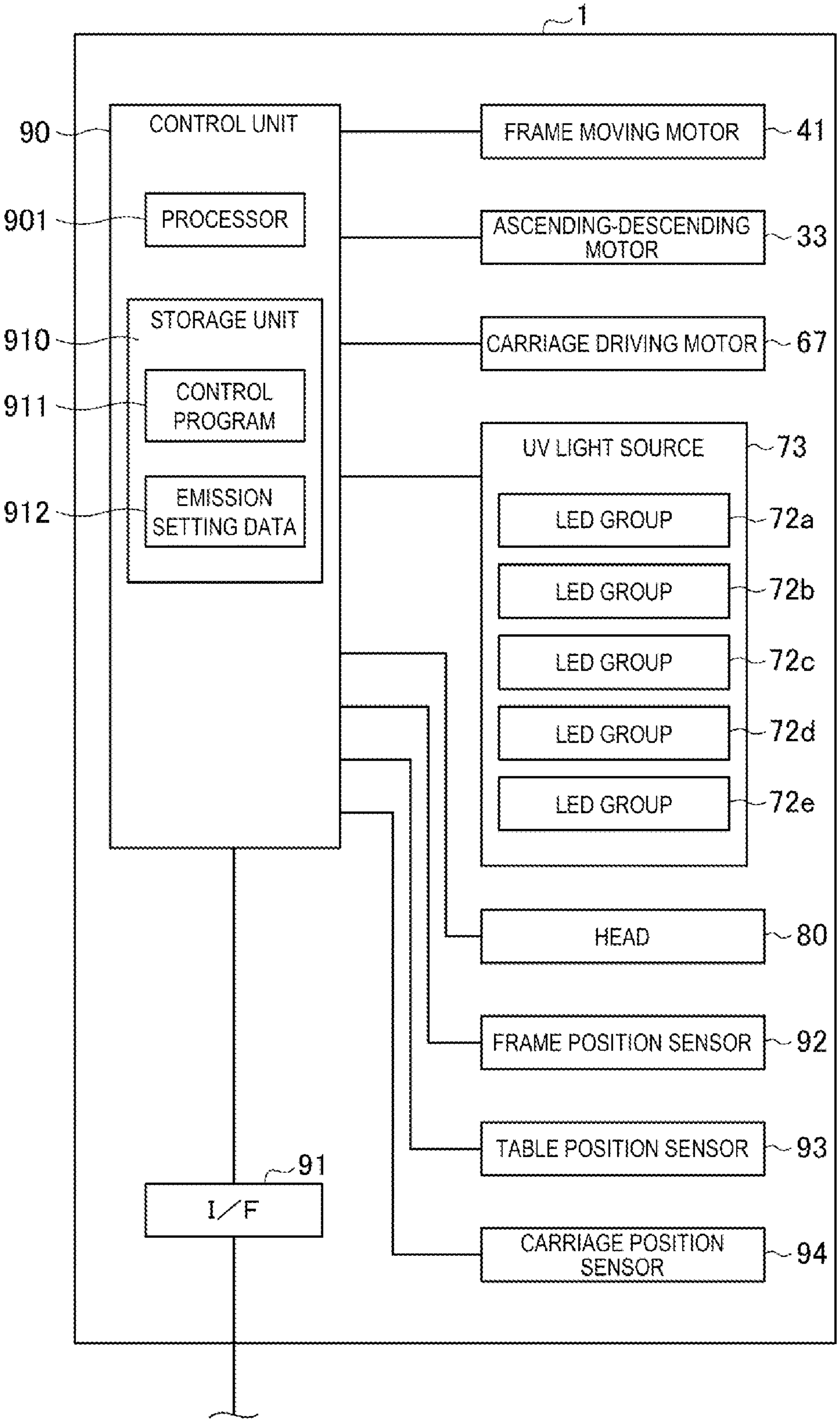
FIG. 9 is a block diagram illustrating the printing apparatus.

FIG. 9 is a block diagram illustrating the printing apparatus 1, and illustrates the functional configuration of the control system of the printing apparatus 1.

The printing apparatus 1 includes the control unit 90. The control unit 90 includes a processor 901 comprised of a central processing unit (CPU), a micro processing unit (MPU), or the like, and also includes a storage unit 910. The storage unit 910 includes a volatile memory and a non-volatile storage unit. The volatile memory is, for example, a random access memory (RAM). The non-volatile storage unit is comprised of a read only memory (ROM), a hard disk, flush memory, or the like. The control unit 90 executes a control program 911 stored in the storage unit 910 to control each component of the printing apparatus 1.

An interface (I/F) 91 is coupled to the control unit 90. The interface 91 is a communication device that performs wired communication using a cable or wireless communication using a wireless communication line. The interface 91 performs communication with a host computer that is not illustrated, to receive print data. The print data includes data concerning an image or characters that the printing apparatus 1 prints on the medium M, a command that instructs the printing apparatus 1 to perform printing, and other data.

The control unit 90 is coupled to the ascending-descending motor 33, the frame moving motor 41, the carriage driving motor 67, the UV light source 73, and the head 80. The control unit 90 is coupled to a frame position sensor 92, a table position sensor 93, and a carriage position sensor 94.

The control unit 90 is able to acquire an electric current value concerning the ascending-descending motor 33, the frame moving motor 41, and the carriage driving motor 67. The control unit 90 detects loads of the ascending-descending motor 33, the frame moving motor 41, and the carriage driving motor 67 based on the acquired electric current value.

The control unit 90 controls turning on and turning off of the UV light source 73. Specifically, the control unit 90 individually controls turning on, turning off, and the light emission intensity of the LED groups 72*a*, 72*b*, 72*c*, 72*d*, and 72*e* that the UV light source 73 includes. For example, the control unit 90 causes the LED group 72 to turn on at the timing when the UV light source 73 approaches the printing area PA during a process in which the carriage 69 moves in the +X direction or the −X direction at the time of printing. Here, the control unit 90 causes the LED group 72 to turn off at the timing when the UV light source 73 deviates from a position that overlaps with the printing area PA. In addition, for example, when the gloss printing is performed, the control unit 90 causes the LED group 72*a* to turn off, and causes the LED groups 72*b*, 72*c*, 72*d*, and 72*e* to turn on. Furthermore, the control unit 90 adjusts the current supplied to the LED groups 72*a*, 72*b*, 72*c*, 72*d*, and 72*e* to adjust the light emission intensity.

For example, the control unit 90 performs pulse wave modulation (PWM) control to the LED group 72*a* to vary the ON/OFF duty of a pulse, which makes it possible to adjust the light emission intensity of the LED group 72*a*. This similarly applies to the LED groups 72*b*, 72*c*, 72*d*, and 72*e*. The UV light source 73 may be configured to include an LED driving circuit configured to switch ON/OFF of a current to the LED groups 72*a*, 72*b*, 72*c*, 72*d*, and 72*e* in accordance with control of the control unit 90, and also adjust the current.

The control unit 90 sets the light emission intensity of the LED groups 72*a*, 72*b*, 72*c*, 72*d*, and 72*e* based on emission setting data 912 stored in the storage unit 910. The emission setting data 912 includes data used to determine the light emission intensity of the LED groups 72*a*, 72*b*, 72*c*, 72*d*, and 72*e* and whether it is turned on or turned off, in accordance with whether the printing mode of the printing apparatus 1 is the gloss printing or the matte printing. For example, the emission setting data 912 designates the light emission intensity of the LED group 72*b*, 72*c*, 72*d*, 72*e* when the LED group 72*a* is caused to turn off during the gloss printing. In this case, to prevent the ultraviolet light emitted to the medium M from being reduced by causing the LED group 72*a* to turn off, the light emission intensity of the LED group 72*b* and the LED group 72*c* is set to a value higher than the light emission intensity of the LED group 72*b*, 72*c* at the time of the matte printing. In this case, setting is made such that the sum of the light emission intensities of the LED groups 72*b* and 72*c* at the time of the gloss printing is predetermined light emission intensity. Here, the predetermined light emission intensity represents an index value determined, for example, with consideration that a test pattern is printed to the medium M with the gloss printing. Alternatively, the predetermined light emission intensity may be set based on the sum of the light emission intensities of the LED groups 72*a*, 72*b*, and 72*c* at the time of the matte printing. In addition, the emission setting data 912 may include data used to determine the light emission intensity of the LED group 72*a*, 72*b*, 72*c*, 72*d*, 72*e* in association with the amount of ink that the printing apparatus 1 discharges to the medium M, the size of the printing area PA of the medium M, the size of the medium M, the color of ink, and the like. In addition, the emission setting data 912 may include data used to determine the light emission intensity of the LED group 72*a*, 72*b*, 72*c*, 72*d*, 72*e* in association with the number of times of printing pass per unit area of the medium M. Furthermore, the emission setting data 912 may include data used to determine the light emission intensity of the LED group 72*a*, 72*b*, 72*c*, 72*d*, 72*e* in association with the movement velocity of the carriage 69 at the time of printing.

The frame position sensor 92 is a sensor configured to detect the position of the main frame 51 in the Y-axis. For example, the frame position sensor 92 is a linear encoder disposed along the guide shaft 15. The table position sensor 93 is a sensor configured to detect the position of the table 31 in the Z-axis. The table position sensor 93 is, for example, a rotary encoder configured to detect the amount of rotation of the ascending-descending motor 33 or a rotary encoder configured to detect the amount of rotation of the ball screw of the ascending-descending mechanism 39. The carriage position sensor 94 is a sensor configured to detect the position of the carriage 69 in the X-axis. For example, the carriage position sensor 94 is a linear encoder disposed along the carriage guide shaft 63. The control unit 90 determines the position of the main frame 51, the position of the table 31, and the position of the carriage 69 based on the detected values from the frame position sensor 92, the table position sensor 93, and the carriage position sensor 94.

The control unit 90 causes each of the motors to operate based on the print data that the interface 91 receives. Specifically, the control unit 90 controls switching of the rotational direction of the frame moving motor 41, and starting or stopping the rotation of the frame moving motor 41 to move the moving unit 50 back and forth. The control unit 90 controls switching of the rotational direction of the ascending-descending motor 33, and starting or stopping the rotation of the ascending-descending motor 33 to move the table 31 in the Z-axis. The control unit 90 controls switching of the carriage driving motor 67, and starting or stopping the rotation of the carriage driving motor 67 to move the carriage 69 in the X-axis. During these controls, the control unit 90 uses the detected values from the frame position sensor 92, the table position sensor 93, and the carriage position sensor 94.

The control unit 90 operates the head 80 based on the print data that the interface 91 receives, to discharge ink.

5. Operation of Printing Apparatus

Figure 10:
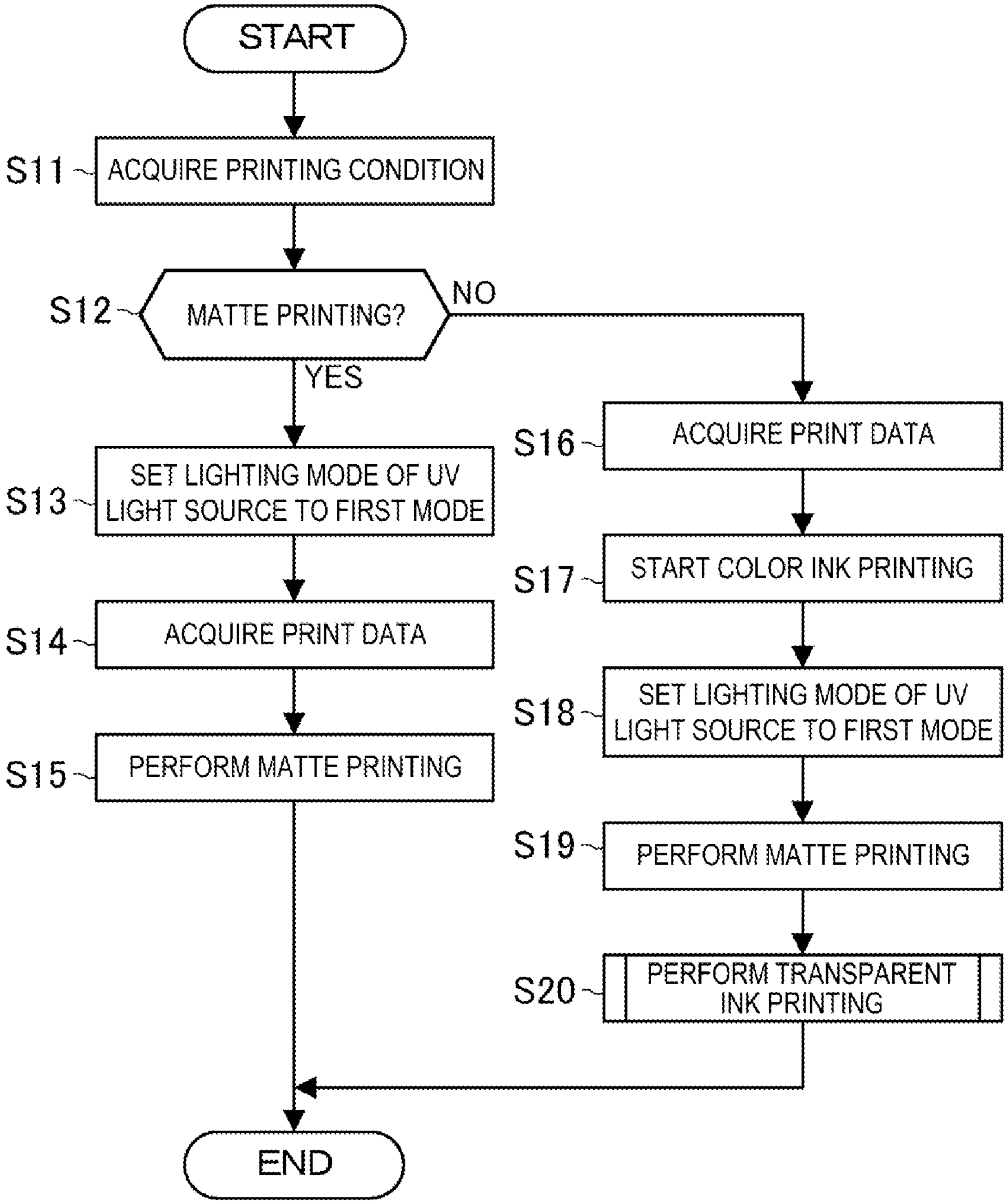
FIG. 10 is a flowchart illustrating an operation of the printing apparatus.
Figure 11:
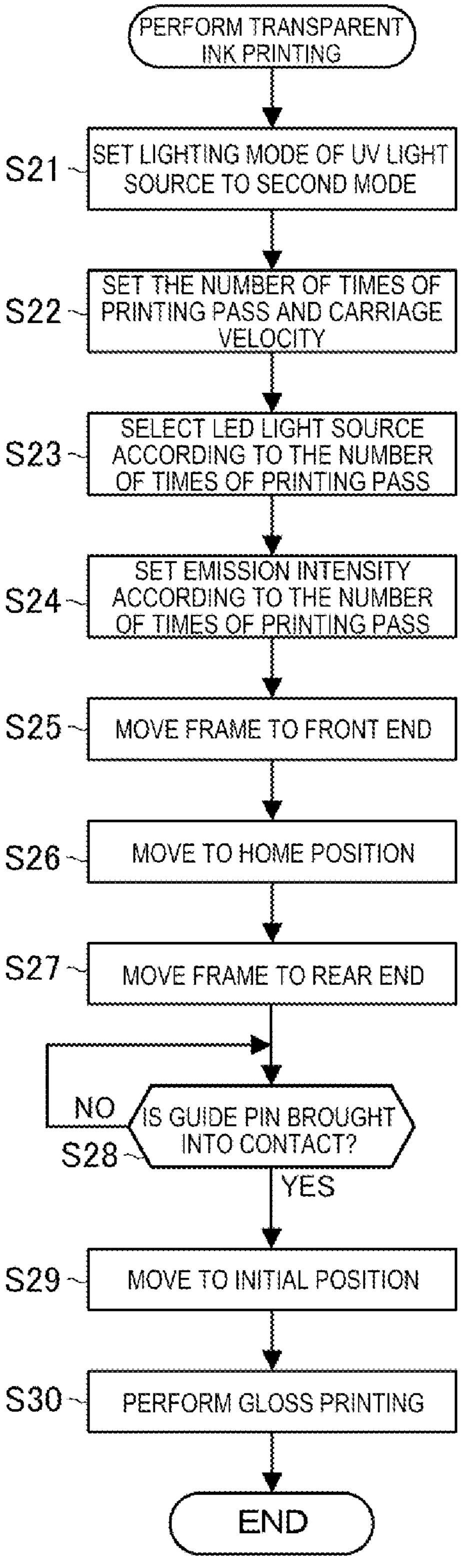
FIG. 11 is a flowchart illustrating an operation of the printing apparatus.

FIGS. 10 and 11 are flowcharts each illustrating an operation of the printing apparatus 1. At the time when the printing apparatus 1 starts the operation illustrated in FIG. 10, the light emission unit 70 is located at the first relative position P1, the carriage 69 is located at the home position, and the main frame 51 is located at the front-side end portion. In addition, the distance between the nozzle section 83 and the medium M is in a state of having been adjusted so as to be the distance suitable for printing. The operations illustrated in FIGS. 10 and 11 are performed by the processor 901.

The printing apparatus 1 acquires a printing condition (step S11). The printing condition includes, for example, information used to designate whether printing to the medium M is performed with the matte printing or the gloss printing, information concerning the number of times of printing pass, or information concerning the movement velocity of the carriage 69. For example, the printing condition is added to the print data including an image or a character that is printed on the medium M or included in the print data. The printing apparatus 1 acquires the printing condition from the print data received from the interface 91, for example, in step S11.

The printing apparatus 1 determines whether the matte printing is performed, based on the printing condition acquired in step S11 (step S12). When it is determined that the matte printing is performed (step S12; YES), the printing apparatus 1 starts the matte printing using the color ink and the transparent ink. That is, the printing apparatus 1 sets the first mode as the lighting mode of the UV light source 73 (step S13), acquires the print data (step S14), and performs the matte printing based on the print data (step S15).

When the printing apparatus 1 determines that the matte printing is not performed (step S12; NO), the printing apparatus 1 acquires the print data (step S16), and starts the gloss printing. The gloss printing includes the matte printing using the color ink and the gloss printing using the transparent ink. The printing apparatus 1 starts printing using the color ink (step S17). The printing using the color ink is matte printing. Thus, the printing apparatus 1 sets the first mode as the lighting mode of the UV light source 73 (step S18), and performs the matte printing based on the print data (step S19). Then, the printing apparatus 1 performs the gloss printing using the transparent ink (step S20). Details of the operation in step S20 are illustrated in FIG. 11.

As illustrated in FIG. 11, the printing apparatus 1 sets the second mode as the lighting mode of the UV light source 73 (step S21). The second mode is a mode in which, for example, the LED group 72*a* does not turn on and the LED groups 72*b*, 72*c*, 72*d*, and 72*e* turn on.

The printing apparatus 1 determines the number of times of printing pass for printing the transparent ink on the medium M and the velocity of the carriage 69 (step S22). The printing apparatus 1 selects an LED group 72 to be turned on, from among the plurality of LED groups 72 that the UV light source 73 includes, based on the number of times of printing pass (step S23). In the initial value of the second mode, the LED groups 72*b*, 72*c*, 72*d*, and 72*e* are selected. In step S23, when the number of times of printing pass per unit area of the medium M is a first pass number, the printing apparatus 1 selects the LED groups 72*b*, 72*c*, 72*d*, and 72*e* as the LED group 72 to be turned on. In this example, when the number of times of printing pass per unit area of the medium M is a second pass number that is greater than the first pass number, the LED groups 72*c*, 72*d*, and 72*e* are selected as the LED group 72 to be turned on. When the number of times of printing pass per unit area of the medium M is the second pass number, the number of times that the carriage 69 scans over the medium M is larger than when the number of times of printing pass per unit area of the medium M is a first pass number. Thus, even if the LED group 72*b* does not turn on, it is possible to emit ultraviolet light with the sufficient amount of light for ink. In addition, by causing the LED group 72*b* to turn off, it is possible to suppress ink being irradiated with reflected light or leaked light of the ultraviolet light emitted by the LED group 72. This makes it possible to more reliably flatten the front surface of the ink. In step S23, the printing apparatus 1 may not change the LED group 72 selected based on the number of times of pass per unit area of the medium M. That is, the printing apparatus 1 may fix the LED group 72 to be turned on, regardless of the number of times of pass per unit area of the medium M.

The printing apparatus 1 sets the emission intensity of the LED group 72 selected in step S22, in accordance with the number of times of printing pass (step S24). In step S24, the printing apparatus 1 is configured, for example, such that the emission intensity of the LED group 72 when the number of times of printing pass per unit area of the medium M is the first pass number is higher than the emission intensity when the number of times of printing pass per unit area of the medium M is the second pass number. In other words, as the number of times of printing pass reduces, the emission intensity of the LED group 72 is set to increase. When the number of times of printing pass per unit area of the medium M is the first pass number, the number of times that the carriage 69 scans over the medium M is smaller than when the number of times of printing pass per unit area of the medium M is the second pass number. Thus, by increasing the emission intensity of the LED group 72, it is possible to emit ultraviolet light with the sufficient amount of light for ink. Here, the emission intensity of the LED group 72 represents a sum of the intensities of emission of LED groups 72 that turn on in the UV light source 73.

In step S24, the printing apparatus 1 may set the emission intensity of each of the LED groups 72 selected in step S23. For example, when the LED groups 72*b* to 72*e* are caused to turn on, the printing apparatus 1 sets the emission intensity of each of the LED groups 72*b* and 72*c* such that the sum of the intensities of emission of the LED group 72*b* and the LED group 72*c* is a predetermined value. Specifically, the printing apparatus 1 sets the emission intensity of the LED group 72*b*, 72*c* so that the sum of intensities of emission of the LED group 72*b* and the LED group 72*c* is equal to the sum of intensities of emission of the LED groups 72*a* to 72*c* in the first mode or a difference between them falls in a predetermined range.

Then, the printing apparatus 1 causes the frame moving motor 41 to drive to move the main frame 51 to the front-side end portion (step S25). The printing apparatus 1 causes the carriage driving motor 67 to drive to move the carriage 69 to the home position (step S26). With these operations, the first contact portion 78 of the light emission unit 70 and the second contact portion 14 of the main body portion 10 are at such positions that they overlap with each other in the front-rear direction. In addition, the first contact portion 78 is located more forward than the second contact portion 14.

In addition, the printing apparatus 1 causes the frame moving motor 41 to drive to start the movement of the main frame 51 in a rearward direction (step S27). Here, as the main frame 51 moves rearward, the first contact portion 78 also moves rearward. As described above, after step S26 is performed, the first contact portion 78 and the second contact portion 14 overlap with each other in the front-rear direction, and the first contact portion 78 is located more forward than the second contact portion 14. Thus, as the main frame 51 moves rearward, the first contact portion 78 is brought into contact with the second contact portion 14 from the front direction.

With this contact, reaction force from the rearward toward the frontward acts on the first contact portion 78. Immediately after the first contact portion 78 and the second contact portion 14 are brought into contact with each other, the reaction force acting on the first contact portion 78 is small. Thus, the plate spring 76 does not immediately deviate from the first recessed portion 66*a*, and the light emission unit 70 stays at the first relative position P1. As the frame moving motor 41 is caused to further drive from this state, the reaction force acting on the first contact portion 78 gradually increases. As the reaction force acting on the first contact portion 78 increases, the plate spring 76 deviates from the first recessed portion 66*a*, and the light emission unit 70 starts to move frontward relative to the head 80. Furthermore, as the main frame 51 moves rearward, the plate spring 76 is fitted in the second recessed portion 66*b*, and the second guide pin 74*b* is brought into contact with the second contact surface 64*c*. With this operation, the light emission unit 70 is fixed to the second relative position P2. That is, as the carriage 69 moves rearward in a state where the first contact portion 78 and the second contact portion 14 are brought into contact with each other, the light emission unit 70 moves forward relative to the head 80.

The printing apparatus 1 determines whether the second guide pin 74*b* is brought into contact with the second contact surface 64*c* (step S28). As the second guide pin 74*b* is brought into contact with the second contact surface 64*c*, the reaction force acting on the first contact portion 78 is transmitted to the frame moving motor 41 as a load. In step S28, the printing apparatus 1 acquires a value of an electric current flowing through the frame moving motor 41 to identify the load due to the transmitted reaction force. When the value of an electric current flowing through the frame moving motor 41 is less than a predetermined value, the printing apparatus 1 determines that the second guide pin 74*b* is not brought into contact with the second contact surface 64*c* (step S28: NO). In this case, the printing apparatus 1 continues the operation of the frame moving motor 41, and moves the main frame 51 further rearward.

On the other hand, when the value of an electric current flowing through the frame moving motor 41 is equal to or more than the predetermined value, the printing apparatus 1 determines that the second guide pin 74*b* is brought into contact with the second contact surface 64*c* (step S28: YES). In this case, the printing apparatus 1 stops the frame moving motor 41, and moves each of the components of the printing apparatus 1 to the initial position (step S29).

In step S29, the printing apparatus 1 causes the frame moving motor 41 and the carriage driving motor 67 to drive to move the main frame 51 to the front-side end portion and the carriage 69 to the home position. At this time, the control unit 90 controls the frame moving motor 41 and the carriage driving motor 67 so that the first contact portion 78 and the second contact portion 14 are not brought into contact with each other. With this control, the main frame 51 and the carriage 69 are moved to the initial position. The initial position represents a position when printing to the medium M starts, and is, for example, the position illustrated in FIG. 7.

The printing apparatus 1 performs the gloss printing using the transparent ink based on the print data (step S30).

In the operation in FIG. 11, the printing apparatus 1 may set, in step S24, the emission intensity of the LED group 72 in accordance with the movement velocity of the carriage 69. In this case, as the movement velocity of the carriage 69 reduces, the printing apparatus 1 reduces the emission intensity of the LED group 72. This is because, as the movement velocity of the carriage 69 reduces, the period of time when the UV light source 73 stays over the medium M increases, and hence, it is possible to irradiate the ink with the sufficient amount of ultraviolet light even if the emission intensity of the UV light source 73 is low.

6. Effects of Embodiment

As described above, the printing apparatus 1 includes the carriage 69 and the control unit 90. The carriage 69 includes the head 80 configured to move in the first direction along the first axis, and include a plurality of nozzles configured to discharge ink toward the medium. The carriage 69 includes the light emission unit 70 configured to move in the second direction relative to the head 80 and emit ultraviolet light toward the medium, the second direction being a direction along the second axis intersecting the first axis. The light emission unit 70 includes the first emission group and the second emission group arranged in the second direction. The first emission group is disposed at a position that overlaps with the plurality of nozzles in the first direction. The second emission group is disposed at a position that does not overlap with the plurality of nozzles in the first direction. The control unit 90 is configured to perform a first mode in which ultraviolet light is emitted from the first emission group and the second emission group, and the second mode in which ultraviolet light is not emitted from the first emission group and ultraviolet light is emitted from the second emission group.

For example, the first axis is the X-axis. The second axis is the Y-axis. The first direction is the +X direction. The second direction is the +Y direction. The first emission group is any one of the LED groups 72*a*, 72*b*, 72*c*, 72*d*, or 72*e*, and is the LED group 72*a* as one example. The second emission group is any one group from the LED groups 72*a* to 72*e* except for the first emission group, and may include a plurality of groups from among the LED groups 72*a* to 72*e*. For example, the second emission group includes the LED groups 72*b* to 72*e*.

With this configuration, as the light emission unit 70 is able to move relative to the head 80, it is possible to change the timing at which the light emission unit 70 emits ultraviolet light to the ink discharged by the head 80. For example, by delaying the timing for emitting ultraviolet light, it is possible to achieve the gloss printing. Furthermore, the light emission unit 70 includes a first emission group disposed at a position that overlaps with nozzles of the head 80, and a second emission group disposed at a position that does not overlap with the nozzles, and is able to perform the second mode in which ultraviolet light is not emitted from the first emission group. Thus, for example, by combining the movement of the light emission unit 70 with the control in which ultraviolet light is not emitted from the first emission group and ultraviolet light is emitted from the second emission group, it is possible to delay the timing at which the ink discharged from the head 80 is irradiated with ultraviolet light. In this manner, as for the configuration of delaying the timing at which ultraviolet light is emitted to the ink, it is possible to combine enabling the light emission unit 70 to move with causing the light emission unit 70 to turn on in the second mode. Thus, even if displacement of the light emission unit 70 is relatively small, it is possible to effectively delay the timing at which ultraviolet light is emitted. This makes it possible to suppress the displacement of the light emission unit 70, which makes it possible to achieve simplification of the structure of the light emission unit 70 or the carriage 69 and also achieve miniaturization.

In the printing method performed by the printing apparatus 1, the printing apparatus 1 is caused to perform the first mode in which ultraviolet light is emitted from the first emission group and the second emission group, and the second mode in which ultraviolet light is not emitted from the first emission group and ultraviolet light is emitted from the second emission group.

With this printing method, when the second mode is performed, it is possible delay the timing at which ink discharged from the head 80 is irradiated with ultraviolet light. Thus, enabling the light emission unit 70 to move and causing the light emission unit 70 to turn on in the second mode are used in combination, which makes it possible to delay the timing at which ultraviolet light is emitted to the ink. With this configuration, it is possible to effectively delay the timing at which ultraviolet light is emitted, even if the displacement of the light emission unit 70 is relatively small. Thus, it is possible to suppress displacement of the light emission unit 70, which makes it possible to achieve simplification of the structure of the light emission unit 70 or the carriage 69 and also achieve miniaturization.

In the printing apparatus 1, the light emission unit 70 is configured to move between the first relative position P1 and the second relative position P2 in the second direction. At the second relative position P2 of the light emission unit 70, the position of the first emission group is a position that overlaps with the plurality of nozzles in the first direction, and the position of the second emission group is a position that does not overlap with the plurality of nozzles in the first direction.

With this configuration, it is only necessary that the configuration for causing the light emission unit 70 to move is made such that the light emission unit 70 is able to move to a position where the second emission group does not overlap with the plurality of nozzles in the first direction. This eliminates the need of moving the entire light emission unit 70 to a position that does not overlap with the plurality of nozzles, which makes it possible to reduce the size of and simplify the configuration of moving the light emission unit 70.

In the printing apparatus 1, the control unit 90 performs the first mode in a state where the light emission unit 70 is at the first relative position, and performs the second mode in a state where the light emission unit 70 is at the second relative position.

With this configuration, by combining the movement of the light emission unit 70 in the second relative position P2 and control in the second mode, it is possible to delay the timing at which ink discharged from the head 80 is irradiated with ultraviolet light. Thus, even if displacement of the light emission unit 70 is relatively small, it is possible to effectively delay the timing at which ultraviolet light is emitted. This makes it possible to suppress the displacement of the light emission unit 70, which makes it possible to simplify the structure of the light emission unit 70 and the carriage 69, and also achieve miniaturization.

In the printing apparatus 1, the second emission group further includes a third emission group located adjacent to the first emission group in the second direction, and a fourth emission group at an opposite side from the first emission group with the third emission group being interposed between them in the second direction. In the second mode, the control unit 90 controls the light emission unit 70 such that the emission intensity of ultraviolet light emitted from the third emission group is lower than the emission intensity of ultraviolet light emitted from the fourth emission group. The third emission group may be, for example, the LED group 72*b*, and in this case, the fourth emission group is the LED groups 72*c* to 72*e*. In addition, the third emission group may include, for example, the LED groups 72*b* and 72*c*, and in this case, the fourth emission group includes the LED group 72*d*, or includes the LED group 72*d* and the LED group 72*e*. Furthermore, the third emission group may include, for example, the LED groups 72*b*, 72*c*, and 72*d*, and in this case, the fourth emission group includes the LED group 72*e*.

With this configuration, when ultraviolet light is emitted by the first emission group in the second mode, it is possible to reduce the emission intensity of ultraviolet light from the third emission group close to the first emission group to be lower than that from the fourth emission group. Thus, it is possible to suppress the amount of ultraviolet light emitted from the LED group 72 close to the ink discharged from the head 80 and attached at the medium M. This makes it possible to suppress the influence, on the ink, of reflected light or leaked light of the ultraviolet light emitted by the light emission unit 70, which makes it possible to sufficiently flatten the front surface of the ink before the ink is cured, to achieve gloss printing producing a more shine.

In the printing apparatus 1, the control unit 90 controls the light emission unit 70 such that the sum of the emission intensity of ultraviolet light emitted from the third emission group and the emission intensity of ultraviolet light emitted from the fourth emission group falls in a predetermined emission intensity.

With this configuration, even when the emission intensity of ultraviolet light from the third emission group is suppressed, it is possible to irradiate the ink discharged from the head 80 with a sufficient amount of ultraviolet light, which makes it possible to reliably make the ink cured.

In the printing apparatus 1, the second emission group further includes a third emission group located adjacent to the first emission group in the second direction, and a fourth emission group at an opposite side from the first emission group with the third emission group being interposed between them in the second direction. The printing apparatus 1 is able to set the number of times of printing pass to the first pass number and the second pass number greater than the first pass number, the number of times of printing pass being the number of times that the head 80 is moved in the first direction to perform printing to a unit area of the medium M. When the number of times of printing pass is the first pass number, the control unit 90 causes the third emission group and the fourth emission group to emit ultraviolet light. When the number of times of printing pass is the second pass number, the control unit 90 does not cause the third emission group to emit ultraviolet light and causes the fourth emission group to emit ultraviolet light. The correspondence of the configuration illustrated in FIG. 8 with the third emission group and the fourth emission group is as described above.

When the number of times of printing pass is large, this configuration utilizes the fact that the number of times that the light emission unit 70 passes over the medium M is large, and reduces the number of LED groups 72 that emit ultraviolet light, which makes it possible to achieve gloss printing producing a more shine.

The printing apparatus 1 is able to set the number of times of printing pass to the first pass number and the second pass number greater than the first pass number, the number of times of printing pass being the number of times that the head is moved in the first direction to perform printing to a unit area of the medium M. The control unit 90 sets the emission intensity of ultraviolet light emitted from the light emission unit 70 when the number of times of printing pass is the first pass number, to be higher than the emission intensity of ultraviolet light emitted from the light emission unit 70 when the number of times of printing pass is the second pass number.

When the number of times of printing pass is large, this configuration utilizes the fact that the number of times that the light emission unit 70 passes over the medium M is large, thereby suppressing the emission intensity of ultraviolet light emitted by the light emission unit 70. With this configuration, it is possible to suppress the influence of reflected light or leaked light of ultraviolet light emitted by the light emission unit 70, on the ink discharged from the head and attached at the medium M. This makes it possible to sufficiently flatten the front surface of the ink before the ink is cured, which makes it possible to achieve gloss printing producing a more shine.

The printing apparatus 1 is able to set the head movement velocity at which the head 80 is moved in the first direction to the first velocity and the second velocity slower than the first velocity. The control unit 90 sets the emission intensity of ultraviolet light emitted from the light emission unit 70 when the velocity of movement of the head 80 is the first velocity, to be higher than the emission intensity of ultraviolet light emitted from the light emission unit 70 when the velocity of movement of the head 80 is the second velocity.

This configuration utilizes the fact that the period of time when the light emission unit 70 stays over the medium M is long when the head movement velocity is low, and suppresses the emission intensity of ultraviolet light emitted from the light emission unit 70. With this configuration, it is possible to suppress the influence of reflected light or leaked light of ultraviolet light emitted by the light emission unit 70, on the ink discharged from the head 80 and attached at the medium M. This makes it possible to sufficiently flatten the front surface of the ink before the ink is cured, which makes it possible to achieve gloss printing producing a more shine.

In addition, the printing apparatus 1 includes the carriage 69 and the control unit 90. The carriage 69 includes the head 80 including a plurality of nozzles and configured to move in the first direction along the first axis, the plurality of nozzles being configured to discharge ink toward the medium. The carriage 69 includes the light emission unit 70 disposed alongside the head 80 in the first direction and configured to emit ultraviolet light toward the medium. The light emission unit 70 includes the first emission group and the second emission group arranged in the second direction, the second direction being a direction along the second axis intersecting the first axis. The first emission group is disposed at a position that overlaps with the plurality of nozzles in the first direction, and the second emission group is disposed at a position that does not overlap with the plurality of nozzles in the first direction. The second emission group further includes the third emission group located adjacent to the first emission group in the second direction, and the fourth emission group at an opposite side from the first emission group with the third emission group being interposed between them in the second direction. The control unit 90 is configured to perform a first mode in which ultraviolet light is emitted from the first emission group and the second emission group, and a second mode in which ultraviolet light is not emitted from the first emission group and ultraviolet light is emitted from the second emission group. In the second mode, the control unit 90 controls the light emission unit 70 such that the emission intensity of ultraviolet light emitted from the third emission group is lower than the emission intensity of ultraviolet light emitted from the fourth emission group. The correspondence of the configuration illustrated in FIGS. 1 to 8 with the first axis, the second axis, the first direction, the second direction, the first emission group, the second emission group, the third emission group, and the fourth emission group is configured in the manner described above.

With this configuration, ultraviolet light is not emitted from the first emission group disposed at a position that overlaps with nozzles of the head 80 in the second mode, and ultraviolet light is emitted from the second emission group. This makes it possible to delay the timing at which ink discharged by the head 80 is irradiated with ultraviolet light.

Furthermore, in the second mode, the emission intensity of ultraviolet light emitted from the third emission group close to the first emission group is lower than that from the fourth emission group. This makes it possible to suppress the influence, on the ink, of reflected light or leaked light of ultraviolet light emitted from the light emission unit 70. Thus, even when the printing apparatus 1 does not include a configuration of largely moving the light emission unit 70, by performing the second mode, it is possible to sufficiently flatten the front surface of the ink before the ink is cured to achieve gloss printing producing a high shine. In the printing apparatus 1 that performs the gloss printing, this makes it possible to simplify the structure of the light emission unit 70 and the carriage 69 and also achieve miniaturization.

7. Modification Example

Figure 12:
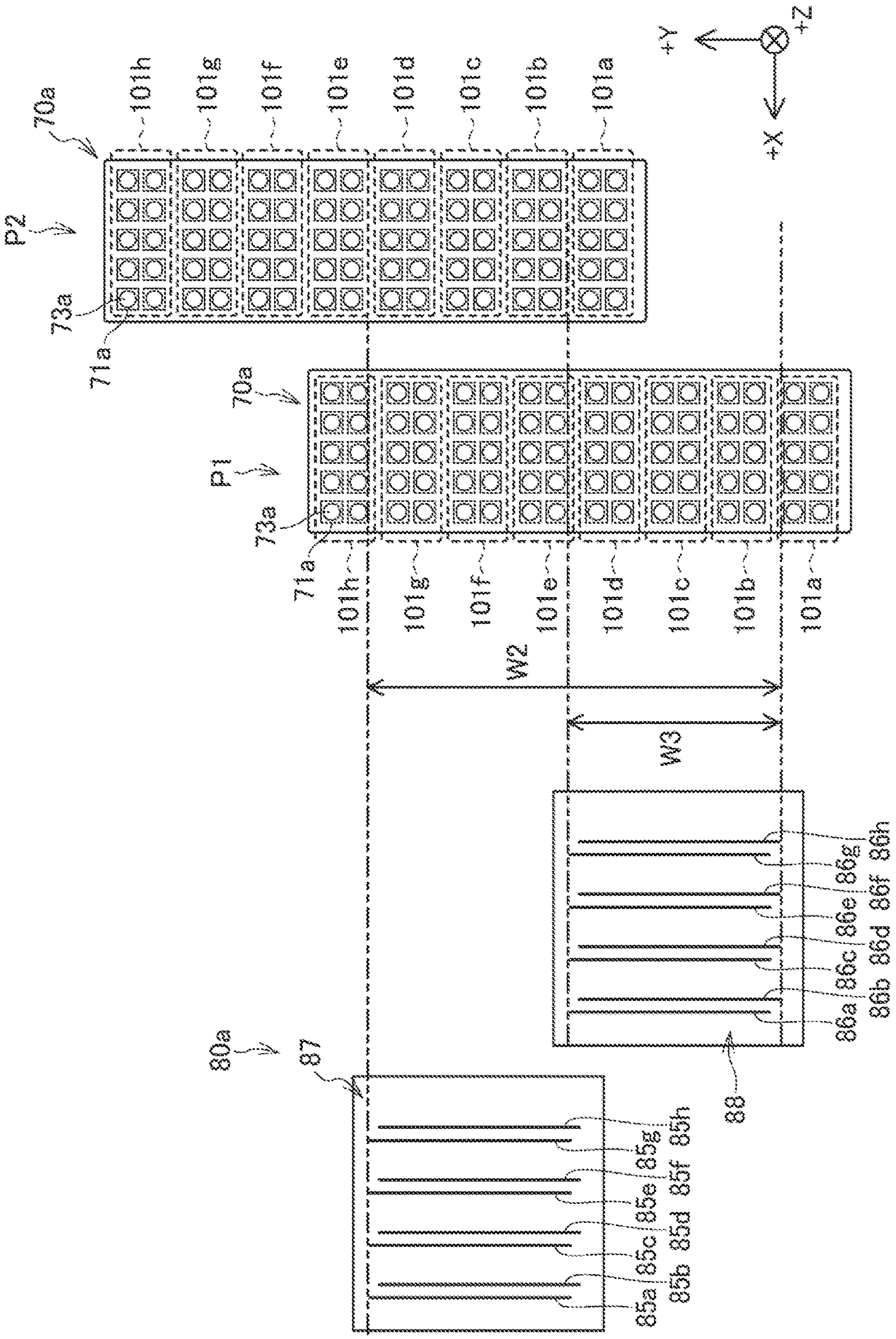
FIG. 12 is a schematic view illustrating a relative positional relationship between a head and UV light source in a modification example.

FIG. 12 is a schematic view illustrating a relative positional relationship between a head and a UV light source in a modification example.

As another example of the head 80, FIG. 12 illustrates a configuration in which the printing apparatus 1 includes a head 80*a* including a first head 87 and a second head 88. FIG. 12 illustrates a positional relationship between the head 80*a* and a light emission unit 70*a* in the +Y direction for each of the first relative position P1 and the second relative position P2. For the purpose of convenience of explanation, the position of the light emission unit 70*a* in the +X direction differs from those in the other drawings.

The first head 87 includes a nozzle section including a plurality of nozzle rows 85. Specifically, the nozzle rows 85 include nozzle rows 85*a*, 85*b*, 85*c*, 85*d*, 85*e*, 85*f*, 85*g*, and 85*h*. When the nozzle row 85*a* to nozzle row 85*h* are not separately treated, they are each referred to as a nozzle row 85.

The nozzle row 85 has a configuration in which a plurality of nozzles are arranged straightly in the +Y direction. The nozzle row 85 may be configured with nozzles arranged in one column or may be configured with nozzles in a plurality of columns. The nozzle rows 85*a* to 85*h* each discharge ink that the printing apparatus 1 uses to perform printing. For example, in a configuration in which the printing apparatus 1 performs full-color printing, the nozzle rows 85*a* to 85*h* each discharge ink of each color that the printing apparatus 1 uses. In this case, ink colors are assigned to any of nozzle rows 85 as appropriate. For example, the nozzle rows 85*a* and 85*b* discharge ink of cyan, the nozzle rows 85*c* and 85*d* discharge ink of magenta, the nozzle rows 85*e* and 85*f* discharge ink of yellow, and the nozzle rows 85*g* and 85*h* discharge ink of black.

The second head 88 includes a nozzle section including a plurality of nozzle rows 86. Specifically, the nozzle rows 86 include nozzle rows 86*a*, 86*b*, 86*c*, 86*d*, 86*e*, 86*f*, 86*g*, and 86*h*. When the nozzle row 86*a* to nozzle row 86*h* are not separately treated, they are each referred to as a nozzle row 86.

The nozzle row 86 has a configuration in which a plurality of nozzles are arranged straightly in the +Y direction. The nozzle row 86 may be configured with nozzles arranged in one column or may be configured with nozzles in a plurality of columns. The nozzle rows 86*a* to 86*h* each discharge ink that the printing apparatus 1 uses to perform printing. For example, the nozzle rows 86*a* to 86*d* discharge ink of white, and the nozzle rows 86*e* to 86*h* discharge transparent ink.

In this modification example, the printing apparatus 1 includes a light emission unit 70*a* in place of the light emission unit 70.

The first head 87 and the second head 88 of the head are at different positions in the +Y direction. In order to accommodate both of the first head 87 and the second head 88, the printing apparatus 1 according to the modification example includes the light emission unit 70*a* that overlaps with positions of the first head 87 and the second head 88 in the +Y direction.

As with the light emission unit 70, the light emission unit 70*a* includes a plurality of light-emitting elements 73*a* and a plurality of emission ports 71*a*. The light-emitting elements 73*a* included in the light emission unit 70*a* are categorized into a plurality of LED groups 101. FIG. 7 illustrates an example in which categorizing is made into eight LED groups 101*a*, 101*b*, 101*c*, 101*d*, 101*e*, 101*f*, 101*g*, and 101*h*. When the LED groups 101*a* to 101*h* are not separately treated, they are each referred to as an LED group 101.

Each of the LED groups 101 includes the plurality of light-emitting elements 73*a*. In the modification example in FIG. 12, the LED groups 101*a* to 101*e* each include ten light-emitting elements 73*a* in total in two rows in the +X direction and five columns in the +Y direction. In the UV light source 73, the LED groups 101 are arranged in the +Y direction in the order of the LED groups 101*a*, 101*b*, 101*c*, 101*d*, 101*e*, 101*f*, 101*g*, and 101*h*.

As with the light emission unit 70, the light emission unit 70*a* is able to move in the +Y direction, and moves between the first relative position P1 and the second relative position P2.

In the +Y direction, the region where nozzles of the nozzle rows 85*a* to 85*h* and nozzles of the nozzle rows 86*a* to 86*h* are opened is referred to as a region W2. Of the region, the region where nozzles of the nozzle rows 86*a* to 86*h* are opened is referred to as a region W3.

When the light emission unit 70*a* is located at the first relative position P1, the entire region W2 overlaps with the light emission unit 70*a* in the +Y direction. For example, as illustrated in FIG. 12, the LED groups 101*b* to 101*g* overlap in the +Y direction with the nozzle row 85 and the nozzle row 86.

On the other hand, when the light emission unit 70*a* is located at the second relative position P2, at least a portion of the region of the region W3 does not overlap with the light emission unit 70*a*. In other words, the LED group 101 that overlaps with the region W3 is a portion of the LED groups 101 that the light emission unit 70*a* includes. For example, as illustrated in FIG. 12, only the LED group 101*a* overlaps in the +Y direction with the nozzle row 86, and the LED groups 101*b* to 101*h* do not overlap with the nozzle row 86.

In the configuration in FIG. 12, at the first relative position P1, the light emission unit 70*a* is aligned with both the first head 87 and the second head 88 in the +Y direction. When the light emission unit 70*a* is located at the first relative position P1, the control unit 90 performs the first mode to cause the LED groups 101*a* to 101*h* to emit ultraviolet light. Thus, it is possible to emit ultraviolet light from the light emission unit 70*a* to the color ink discharged from the first head 87 and also to the white ink and the transparent ink discharged from the second head 88. The pre-emission period in this case is shorter than the period of time for flattening the ink attached at the medium M, and hence, the matte printing is performed.

When the light emission unit 70*a* is moved to the second relative position P2, the control unit 90 causes the LED group 101*a* to turn off, and causes an LED group 101 selected from among the LED groups 101*b* to 101*h*, to emit ultraviolet light. This operation corresponds to an operation of the second mode. Thus, at the second relative position P2, the light emission unit 70*a* does not emit ultraviolet light at a position that overlaps with the region W3.

At this time, the color ink discharged from the first head 87 is irradiated with ultraviolet light for a short pre-emission period. The pre-emission period in this case is similar to that when the light emission unit 70*a* is located at the first relative position P1. On the other hand, the transparent ink discharged from the second head 88 is irradiated with ultraviolet light for a long pre-emission period. This pre-emission period lasts for not less than a period required to flatten the transparent ink attached at the medium M, and hence, the gloss printing is performed.

In this manner, the modification example in FIG. 12 makes it possible to perform gloss printing using the transparent ink in the configuration in which the first head 87 configured to discharge the color ink and the second head 88 configured to discharge the transparent ink are separately provided. Control by the control unit 90 described in the embodiment described above is applied to this modification example, and hence, it is possible obtain an effect similar to that of the embodiment described above.

For example, the first emission group is any one of the LED groups 101*a* to 101*h*, and is the LED group 101*a* as one example. The second emission group is any of the LED groups 101*a* to 101*h* except for the first emission group, and may include a plurality of groups from among the LED groups 101*a* to 101*h*. For example, the second emission group includes the LED groups 101*b* to 101*h*. The third emission group may be, for example, the LED group 101*b*, and in this case, the fourth emission group is any one of the LED groups 101*c* to 101*h*. In addition, the third emission group may include, for example, the LED groups 101*b* and 101*c*, may include the LED groups 101*b* to 101*d*, and may include other combinations of the LED groups 101*d* to 101*h*. The fourth emission group in these cases includes a combination using the LED groups 101*d* to 101*h*.

In the modification example in FIG. 12, assignment of colors of ink to the nozzle row 85 and the nozzle row 86 can be changed as appropriate. For example, the ink assigned to the nozzle rows 85*a* to 85*h* may include ink of halftone or ink of light color, and color ink other than white ink may be assigned to the nozzle rows 86*a* to 86*d*.

8. Other Embodiments

The embodiment has described a specific example to which the present disclosure is applied. The present disclosure is not limited to the configurations in the embodiment described above, and can be implemented in various modes without departing from the gist of the disclosure.

In the embodiment described above, the configuration that enables the light emission unit 70 to move in the direction along the X-axis is not limited to the mode described above. For example, the embodiment described above gives a configuration in which the first contact portion 78 and the second contact portion 14 are provided, as the configuration that enables the light emission unit 70 to move. This configuration is merely one example. For example, either the first contact portion 78 or the second contact portion 14 or both of them may be comprised of an elastic member. This elastic member may be made of rubber or silicon, or may be a coil spring or a plate spring.

In the embodiment described above, the relative position between the light emission unit 70 and the head 80 can be changed on an as-necessary basis. For example, the embodiment described above gives an example in which the light emission unit 70 is provided at the −X direction side of the head 80. However, it may be possible to employ a configuration in which two light emission units 70 are mounted at the carriage 69, and the light emission units 70 are disposed at the +X direction side and the −X direction side of the head 80. In this configuration, it may be possible to further employ a configuration in which the two light emission units 70 are integrally moved relative to the head 80.

In addition, it may be possible to change, on an as-necessary basis, the configuration of the printing apparatus 1 causing the moving unit 50 to move along the Y-axis and the configuration that enables the table 31 to ascend and descend.

It may be possible to employ a configuration in which at least a portion of the function blocks illustrated in FIG. 9 is achieved with hardware, or achieved in combination of hardware and software. Furthermore, the processing of the flowcharts illustrated in FIGS. 10 and 11 is divided into units according to the main content of the processing to facilitate understanding of the operation of the printing apparatus 1. Thus, the present embodiment is not limited by the way of dividing the processing units illustrated in the drawings or the names thereof.

What is claimed is:

1. A printing apparatus comprising:

a carriage including:

a head including a plurality of nozzles and configured to move in a first direction along a first axis, the plurality of nozzles being configured to discharge ink toward a medium and a light emission unit configured to move in a second direction relative to the head and emit ultraviolet light toward the medium, the second direction being a direction along a second axis intersecting the first axis; and a control unit, wherein the light emission unit includes a first emission group and a second emission group arranged in the second direction, the first emission group is disposed at a position that overlaps with the plurality of nozzles in the first direction, the second emission group is disposed at a position that does not overlap with the plurality of nozzles in the first direction, the control unit is configured to perform a first mode in which ultraviolet light is emitted from the first emission group and the second emission group, and a second mode in which ultraviolet light is not emitted from the first emission group and ultraviolet light is emitted from the second emission group, all emission groups that overlap the plurality of nozzles are part of the first emission group, all emission groups that do not overlap the plurality of nozzles are part of the second emission group, the light emission unit is configured to move between a first relative position and a second relative position in the second direction, at the second relative position of the light emission unit, a position of the first emission group is a position that overlaps with the plurality of nozzles in the first direction, and a position of the second emission group is a position that does not overlap with the plurality of nozzles in the first direction, and the control unit performs the first mode in a state where the light emission unit is at the first relative position, and performs the second mode in a state where the light emission unit is at the second relative position.

2. The printing apparatus according to claim 1, wherein the second emission group further includes:

a third emission group located adjacent to the first emission group in the second direction and a fourth emission group at an opposite side from the first emission group with the third emission group being interposed between the first emission group and the fourth emission group in the second direction and in the second mode, the control unit controls the light emission unit such that emission intensity of ultraviolet light emitted from the third emission group is lower than emission intensity of ultraviolet light emitted from the fourth emission group.

3. The printing apparatus according to claim 2, wherein the control unit controls the light emission unit such that a sum of the emission intensity of the ultraviolet light emitted from the third emission group and the emission intensity of the ultraviolet light emitted from the fourth emission group falls in a predetermined emission intensity.

4. The printing apparatus according to claim 1, wherein the second emission group further includes:

a third emission group located adjacent to the first emission group in the second direction and a fourth emission group at an opposite side from the first emission group with the third emission group being interposed between the first emission group and the fourth emission group in the second direction, the number of times of printing pass is settable to a first pass number and a second pass number greater than the first pass number, the number of times of printing pass being the number of times that the head is moved in the first direction to perform printing to a unit area of the medium, when the number of times of printing pass is the first pass number, the control unit causes the third emission group and the fourth emission group to emit ultraviolet light, and when the number of times of printing pass is the second pass number, the control unit does not cause the third emission group to emit ultraviolet light, and causes the fourth emission group to emit ultraviolet light.

5. The printing apparatus according to claim 1, wherein the number of times of printing pass is settable to a first pass number and a second pass number greater than the first pass number, the number of times of printing pass being the number of times that the head is moved in the first direction to perform printing to a unit area of the medium and the control unit sets emission intensity of ultraviolet light emitted from the light emission unit when the number of times of printing pass is the first pass number, to be higher than emission intensity of ultraviolet light emitted from the light emission unit when the number of times of printing pass is the second pass number.

6. The printing apparatus according to claim 1, wherein a head movement velocity at which the head is moved in the first direction is settable to a first velocity and a second velocity slower than the first velocity and the control unit sets emission intensity of ultraviolet light emitted from the light emission unit when the head movement velocity is the first velocity, to be higher than emission intensity of ultraviolet light emitted from the light emission unit when the head movement velocity is the second velocity.

7. The printing apparatus according to claim 1, wherein the first emission group is disposed at a position that overlaps with all of the plurality of nozzles which overlap with the light emission unit in the first direction, and the second emission group is disposed at a position that does not overlap with any the plurality of nozzles in the first direction.

8. Printing apparatus according to claim 1, wherein at the first relative position of the light emission unit, an entirety of the plurality of nozzles overlap with the light emission unit in the first direction and at the second relative position of the light emission unit, at least a portion of the plurality nozzles do not overlap with the light emission unit in the first direction.

9. The printing apparatus according to claim 1, wherein at the second relative position of the light emission unit, a length of the second emission group in the second direction is longer than a length of the plurality of nozzles in the second direction.

10. A printing apparatus comprising:

a carriage including:

a head including a plurality of nozzles and configured to move in a first direction along a first axis, the plurality of nozzles being configured to discharge ink toward a medium and a light emission unit disposed alongside the head in the first direction and configured to emit ultraviolet light toward the medium; and a control unit, wherein the light emission unit includes a first emission group and a second emission group arranged in a second direction, the second direction being a direction along a second axis intersecting the first axis, the first emission group is disposed at a position that overlaps with the plurality of nozzles in the first direction, the second emission group is disposed at a position that does not overlap with the plurality of nozzles in the first direction, the second emission group further includes:

a third emission group located adjacent to the first emission group in the second direction and a fourth emission group at an opposite side from the first emission group with the third emission group being interposed between the first emission group and the fourth emission group in the second direction, the control unit is configured to perform a first mode in which ultraviolet light is emitted from the first emission group and the second emission group, and a second mode in which ultraviolet light is not emitted from the first emission group and ultraviolet light is emitted from the second emission group, in the second mode, the light emission unit is controlled such that emission intensity of ultraviolet light emitted from the third emission group is lower than emission intensity of ultraviolet light emitted from the fourth emission group, all emission groups that overlap the plurality of nozzles are part of the first emission group, and all emission groups that do not overlap the plurality of nozzles are part of the second emission group.

11. A printing method performed by a printing apparatus, the printing apparatus including:

a carriage including:

a head including a plurality of nozzles and configured to move in a first direction along a first axis, the plurality of nozzles being configured to discharge ink toward a medium and a light emission unit configured to move in a second direction relative to the head and emit ultraviolet light toward the medium, the second direction being a direction along a second axis intersecting the first axis, the light emission unit including a first emission group and a second emission group arranged in the second direction, the first emission group being disposed at a position that overlaps with the plurality of nozzles in the first direction, the second emission group being disposed at a position that does not overlap with the plurality of nozzles in the first direction, the printing method comprising performing a first mode in which ultraviolet light is emitted from the first emission group and the second emission group, and a second mode in which ultraviolet light is not emitted from the first emission group and ultraviolet light is emitted from the second emission group, wherein all emission groups that overlap the plurality of nozzles are part of the first emission group, all emission groups that do not overlap the plurality of nozzles are part of the second emission group, the light emission unit is configured to move between a first relative position and a second relative position in the second direction, at the second relative position of the light emission unit, a position of the first emission group is a position that overlaps with the plurality of nozzles in the first direction, and a position of the second emission group is a position that does not overlap with the plurality of nozzles in the first direction, and the control unit performs the first mode in a state where the light emission unit is at the first relative position, and performs the second mode in a state where the light emission unit is at the second relative position.

* * * * *